(12) United States Patent
Kentley-Klay et al.

(10) Patent No.: US 10,780,930 B1
(45) Date of Patent: Sep. 22, 2020

(54) WORM GEAR DRIVE UNIT INTERFACE AND ASSEMBLY METHODS

(71) Applicant: Zoox, Inc., Menlo Park, CA (US)

(72) Inventors: Timothy David Kentley-Klay, Stanford, CA (US); Nicholas Liotta, Menlo Park, CA (US); Chao Lu, Mountain View, CA (US); Paul Choin, Pleasanton, CA (US); Daniel Elliot Schabb, San Francisco, CA (US); Forrest Craft, San Francisco, CA (US); Kevin Hothem, Redwood City, CA (US); James Hedden, Mountain View, CA (US); Brandon Loeb, Campbell, CA (US)

(73) Assignee: Zoox, Inc., Foster City, CA (US)

( * ) Notice: Subject to any disclaimer, the term of this patent is extended or adjusted under 35 U.S.C. 154(b) by 194 days.

(21) Appl. No.: 15/900,521

(22) Filed: Feb. 20, 2018

(51) Int. Cl.
*B62D 65/02* (2006.01)
*G05D 1/02* (2020.01)
(Continued)

(52) U.S. Cl.
CPC .......... *B62D 65/022* (2013.01); *B62B 3/0612* (2013.01); *B62D 65/024* (2013.01);
(Continued)

(58) Field of Classification Search
CPC combination set(s) only.
See application file for complete search history.

(56) References Cited

U.S. PATENT DOCUMENTS 5,110,153 A * 5/1992 Kallansrude ....... B60G 17/0152
180/209
6,256,930 B1 7/2001 Faubert et al.
(Continued)

FOREIGN PATENT DOCUMENTS

CN  203713847 U  * 7/2014
CN  206287898 U  * 12/2016

OTHER PUBLICATIONS

Google Translation of Chinese Patent Application No. CN206287898U that published in 2017 (hereinafter the 898 publication).*
(Continued)

*Primary Examiner* — Jean Paul Cass
(74) *Attorney, Agent, or Firm* — Lee & Hayes, P.C.

(57) ABSTRACT

A system for detachably coupling subassemblies to vehicles or other components is discussed herein. The system can include one or more driveshafts and worm drives to drive fasteners to couple the subassembly to the vehicle. The system can enable drive interfaces located in a substantially conventional location (e.g., located vertically on the bottom of the vehicle) to drive fasteners horizontally into the body or other subassembly. In this manner, fasteners can be hidden and to utilize blind holes in the body of the vehicle. The system can be partially disassembled in situ to enable parts replacement and fastener access in the event of a failure. The system can be used in conjunction with a robotic cart to enable subassemblies to be removed from the vehicle for service and repair. A portion of the system can also act as a portion of, or to reinforce, the crash structure of the vehicle.

20 Claims, 13 Drawing Sheets

(51) Int. Cl.
*B62B 3/06* (2006.01)
*B62D 65/04* (2006.01)

(52) U.S. Cl.
CPC .......... *B62D 65/04* (2013.01); *G05D 1/0212* (2013.01); *G05D 2201/0216* (2013.01)

(56) References Cited

U.S. PATENT DOCUMENTS

| | | | | |
|---|---|---|---|---|
| 6,523,283 | B2 | 2/2003 | Sueshige et al. | |
| 6,523,629 | B1* | 2/2003 | Buttz | B60D 1/00 180/14.2 |
| 6,636,781 | B1* | 10/2003 | Shen | B08B 9/045 318/568.11 |
| 8,196,835 | B2* | 6/2012 | Emanuel | G01S 5/16 235/462.08 |
| 8,336,901 | B2* | 12/2012 | Andre | B62D 47/025 105/8.1 |
| 8,496,078 | B2* | 7/2013 | Wellborn | B62D 59/04 180/14.2 |
| 9,581,983 | B2* | 2/2017 | Kilibarda | G05D 1/0225 |
| 10,222,798 | B1* | 3/2019 | Brady | G05D 1/0278 |
| 10,232,899 | B1* | 3/2019 | Gatta | B62D 65/18 |
| 10,577,180 | B1* | 3/2020 | Mehta | B25J 9/1687 |
| 2003/0155747 | A1* | 8/2003 | Bridges | B25J 5/007 280/652 |
| 2007/0017882 | A1* | 1/2007 | Lewis | B62H 3/08 211/20 |
| 2008/0101899 | A1* | 5/2008 | Slonecker | B60D 1/00 414/462 |
| 2008/0131255 | A1* | 6/2008 | Hessler | B65G 1/1378 414/788.1 |
| 2010/0044998 | A1* | 2/2010 | Franchineau | B60D 1/58 280/491.1 |
| 2017/0282672 | A1* | 10/2017 | Gandhi | B60G 17/0155 |
| 2018/0005176 | A1* | 1/2018 | Williams | G06Q 10/087 |

OTHER PUBLICATIONS

Google Translation of Chinese Patent Application Pub. No. CN203713847U that was published in 2014.*

NPL, Remotely Operating and Battery Operated Transport System Robot, (https://www.gks-perfect.com/en/robot.htm) (2014) (hereinafter GKS perfect).*

Non Final Office Action dated Jan. 3, 2020 for U.S. Appl. No. 15/900,426 "Worm Gear Drive Unit Interface and Assembly Methods" Kentley-Klay, 7 pages.

* cited by examiner

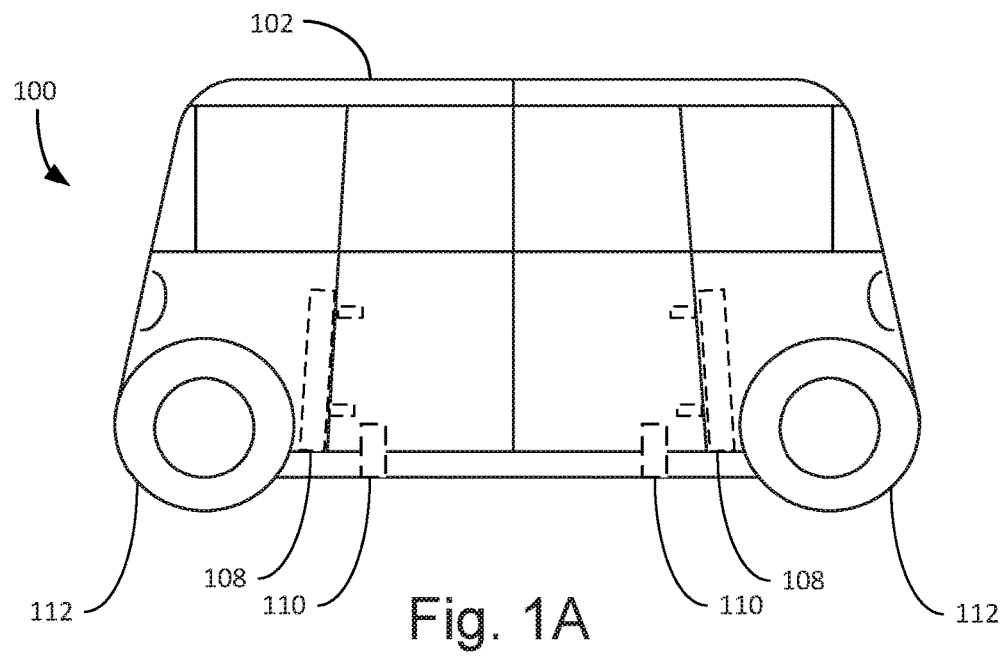
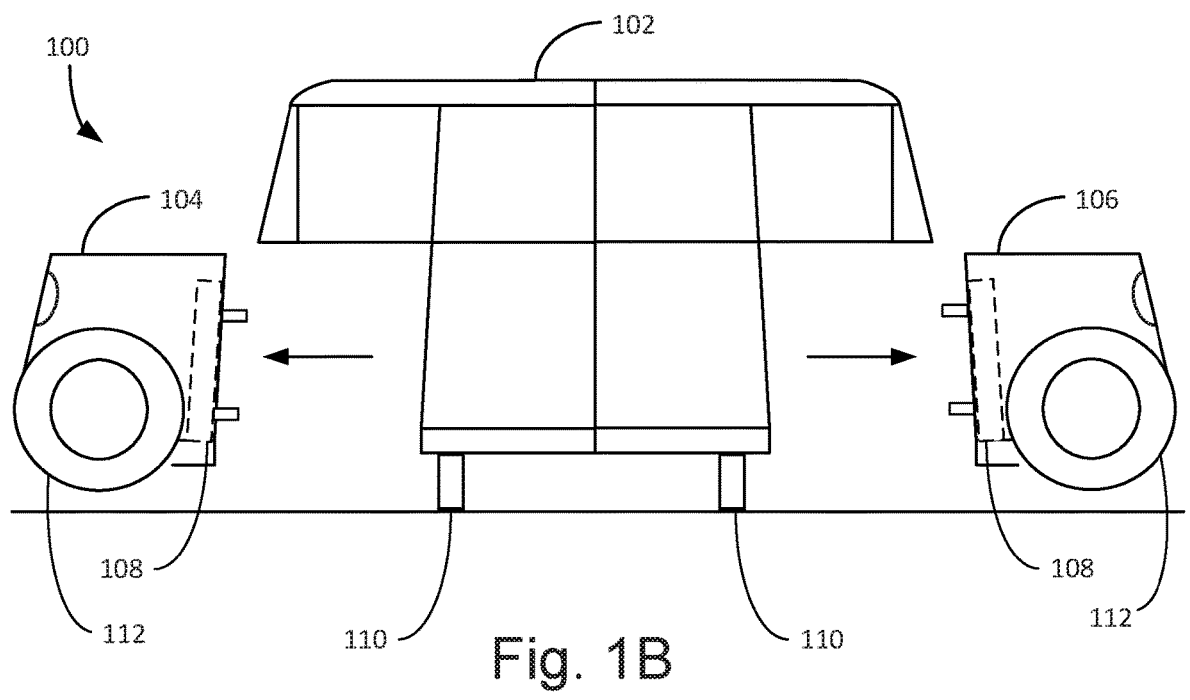

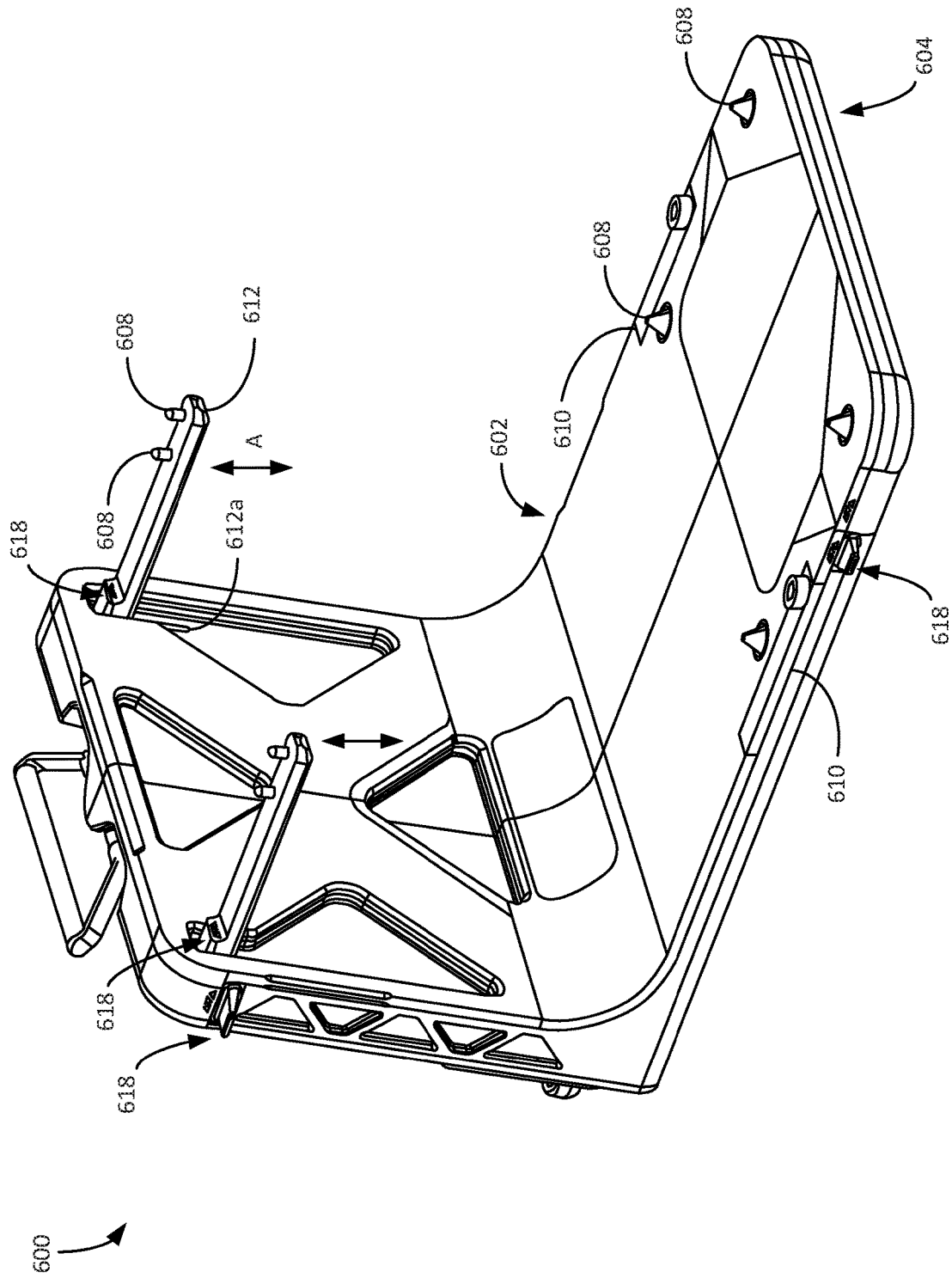

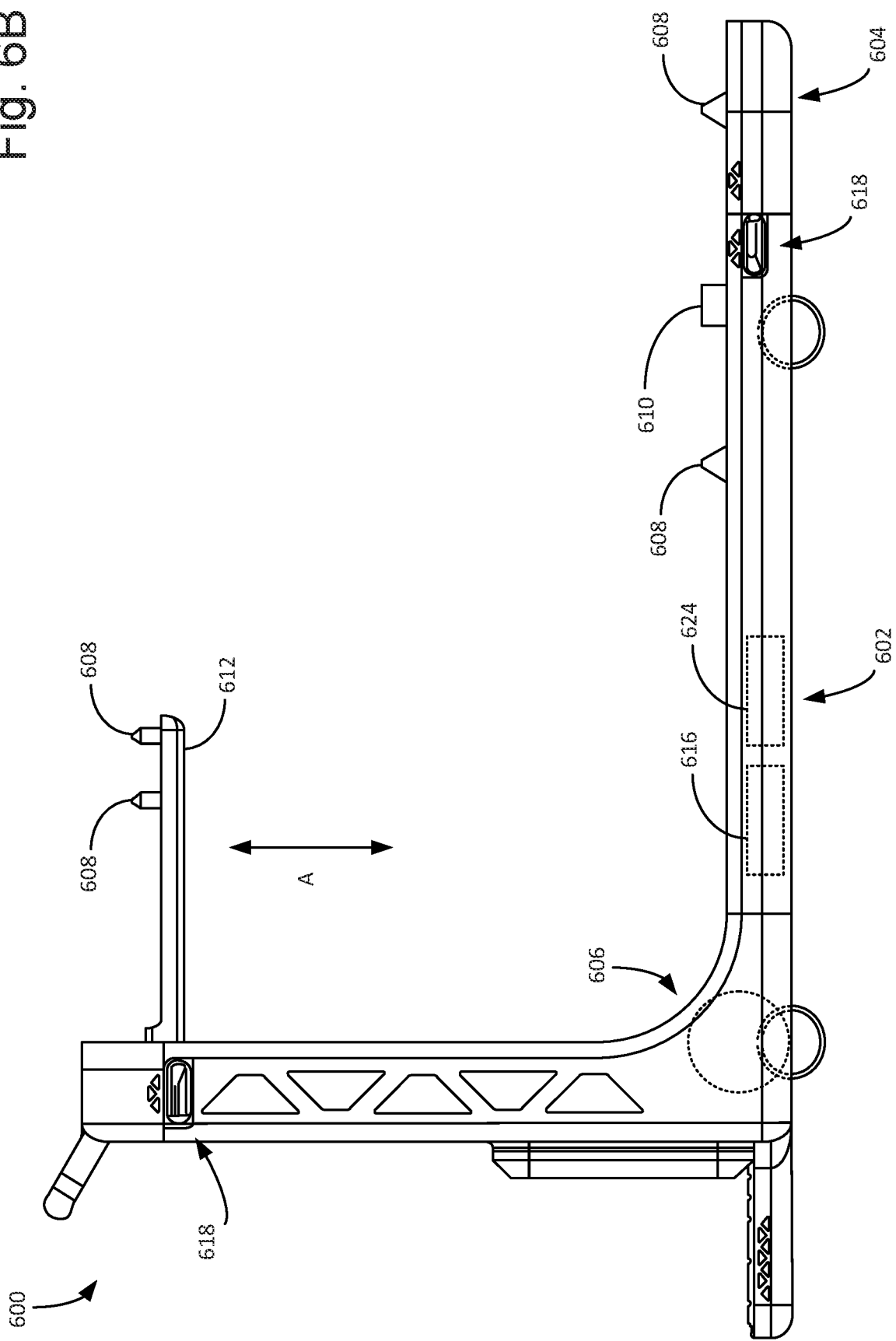

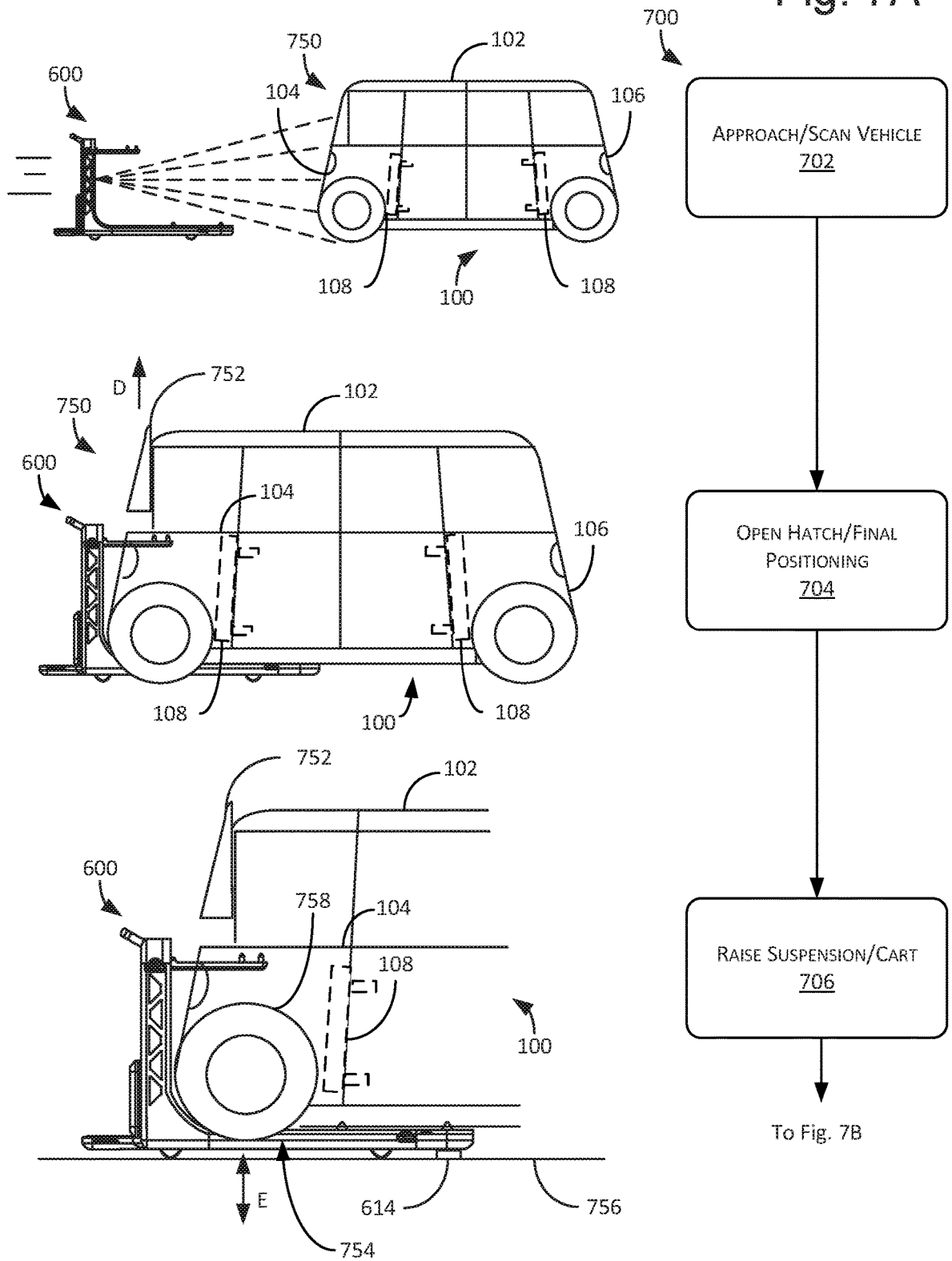

WORM GEAR DRIVE UNIT INTERFACE AND ASSEMBLY METHODS

BACKGROUND

Conventionally, vehicles are assembled in two main sections: the "body in white" and the chassis. When these assemblies reach a certain stage of completion, the assemblies are "married" to form a substantially complete vehicle subject to final assembly. This marriage is generally done with the body on an overhead crane system that lowers the body onto the chassis (e.g., the drivetrain and other components) from above. The body is then generally attached to the chassis using multiple fasteners inserted from the bottom and tightened.

This configuration requires a great deal of infrastructure. In a production setting, multiple overhead cranes, automated carts, assembly lines, and other heavy machinery is required. In addition, the bolts used to connect assemblies are often visible on the complete vehicle or must be covered with trim (e.g., grommets or plugs) and/or sealed in a separate operation. This requires additional steps and additional components, increasing costs.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

FIGS. 1A and 1B depict a modular vehicle with a main body and removable drive units.

FIG. 6A is a perspective view of a robotic cart for use with the fastening system, in accordance with some examples of the present disclosure.

FIG. 6B is a side view of the robotic cart for use with the fastening system, in accordance with some examples of the present disclosure.

FIGS. 7A and 7B include a flowchart depicting a method for using the robotic cart with the fastening system, in accordance with some examples of the present disclosure.

DETAILED DESCRIPTION

Figure 2A:
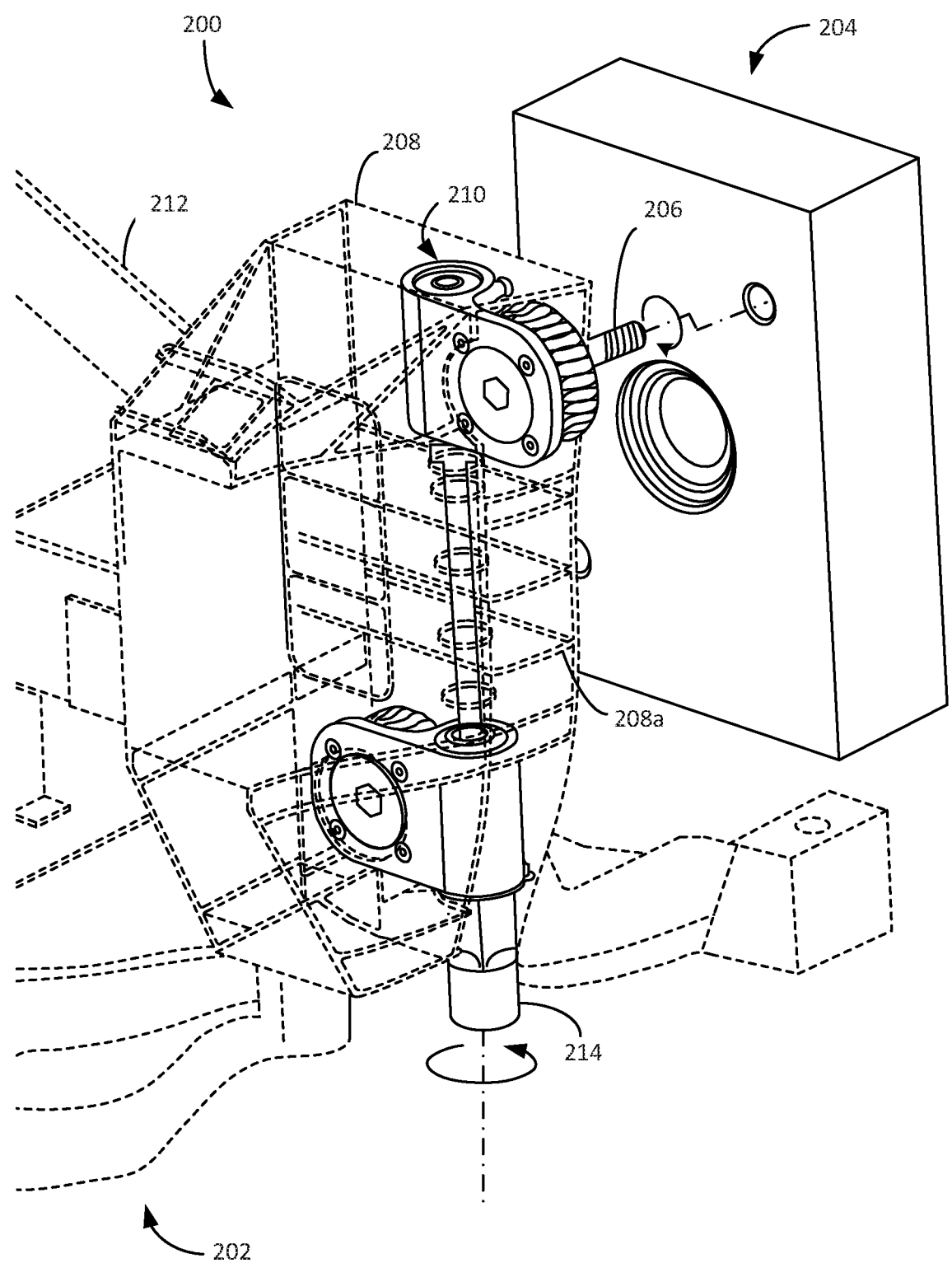
FIG. 2A is a partial cutaway view of a fastening system with a crash structure and drive system installed on a subassembly, in accordance with some examples of the present disclosure.

Examples of the present disclosure relate to systems and methods for assembling and disassembling components in a single operation. In other words, the systems and methods disclosed herein enable components such as, for example, vehicle subassemblies to be installed with fasteners, with the fasteners inserted and torqued in a single operation. The fastening system can also enable the fasteners to be installed using automated systems (e.g., robots and/or automatic torque wrenches), to be substantially hidden from view, and to meet other design criteria (e.g., no fasteners penetrating interior panels).

In some examples, the fastening system can be incorporated into the subassemblies themselves. Thus, the fastening system can be included in a crash structure or subframe, for example, and can enable the crash structure or subframe, along with other components, to be easily attached to another subassembly or the body of the vehicle. The fastening system can also enable these same components to be removed from the vehicle by simply reversing the installation procedure.

In some examples, the system can include one or more worm drives attached to driveshafts and disposed inside a housing. The worm drives can enable a torquing device, such as an automatic torque wrench, to interface with the driveshafts in a substantially conventional manner i.e., vertically from below the vehicle yet rotate fasteners that are disposed horizontally. In this manner, the fasteners can attach one subassembly to another, for example, such as a drive module to a vehicle body, horizontally. This configuration, in turn, can obviate the need for overhead cranes or gantries, among other infrastructure for assembling and disassembling vehicles. In addition, the system can enable the fasteners to be substantially hidden when installed (without additional procedures or parts) and to utilize blind holes, reducing body penetrations, among other things.

For ease of explanation, the systems and methods described below are described in the context of installing and removing drive units from the body of a modular vehicle. One of skill in the art will recognize, however, that these systems and methods are not so limited. Indeed, the systems and methods described herein can be used to assemble and disassemble many different types of components and fasteners without departing from the spirit of the disclosure. The system can be used to fasten transmissions to engines, for example, to install accessories on engines, or to couple and decouple other types of subassemblies and components. Generally, such a system may be employed for any removable subcomponent in a larger assembly.

As mentioned above, conventional vehicle assembly lines generally assemble vehicles in one or more subassemblies that are ultimately brought together to form a completed vehicle. Many vehicles are assembled as a "body in white" and a chassis. The body in white refers to the sheet metal components of the vehicle that generally form the body once they have been welded together. The chassis can comprise, for example, a frame, or multiple sub frames, the suspensions components, engine and transmission, exhaust system, and other components. At a predetermined stage of completion, the body in white and the chassis are brought together, generally using a large overhead conveyor system, and bolted, welded, and/or glued to each other.

This operation, which is commonly referred to as the "marriage," requires significant capital investment. In other words, the chassis is typically riding along a large conveyor or assembly line, or on a robotic cart, while the body in white is generally supported by an overhead crane or gantry system. The conveyor and gantry must then be precisely aligned to enable the two main components to be brought together such that the mounting holes and other components are aligned. In addition, the gantry system and conveyors must be sized and shaped to support the components, which can weigh several hundred to several thousand pounds. To this end, infrastructure costs for a new automotive plant generally exceed one billion dollars, representing a significant barrier to entry.

In addition to the required infrastructure, vehicles made using traditional manufacturing and assembly processes are difficult to service. Each different vehicle make and model has a different combination of components and assemblies. As a result, stocking all of the required parts for each vehicle can be difficult or impossible.

This application, on the other hand, refers to systems and methods that, while suitable for some traditional manufacturing, is suitable for use with modular vehicles. These vehicles can comprise relatively few assemblies, or "modules," that are then mated during a final assembly step or process. In some examples, the vehicles may be assembled from two main types of modules, for example, a body module and a drive module (e.g., at least one drive module at one end of the body module). Indeed, in some examples, one type of drive module may be used with multiple types of body modules, further reducing complexity. Thus, the vehicle assembly plant can be very simple, compact, and inexpensive to construct and maintain. In addition, inventory management is simplified as the assembly plant need only maintain the few modules used to assemble the vehicle in inventory.

The modular construction of the vehicles described herein also greatly improves their serviceability. For instance, in the event of a failure or fault with a component of a module, the module can simply and quickly be removed and replaced with another module. For instance, if a fault occurs with a motor, battery, or other major system of a drive module, the drive module may simply be removed from the vehicle and replaced with another drive module. The replacement of a module may be performed by service personnel, an automated service robot (or robotic cart, as discussed below), or a combination thereof. As shown in FIGS. 1A and 1B, one solution to reducing capital investment is to use modular manufacturing techniques. As shown, a vehicle 100 can be constructed comprising a body 102, a first drive unit 104, and a second drive unit 106, which can be assembled and disassembled horizontally instead of vertically. In this configuration, the vehicle 100 comprises the body 102, which can act as a monocoque and passenger compartment, and the drive units 104, 106, which move and steer the vehicle, among other things. The drive units 104, 106 can comprise, for example, one or more motors, internal combustion engines, fuel cells (or other power sources), differentials, controllers, steering systems, braking systems, HVAC, etc. The drive units 104, 106 and the body 102 can be designed to mate very precisely such that fluids, electronics, HVAC and other functions between the subassemblies can be connected and disconnected using automated equipment and with little, or no, fluid loss.

When attaching the drive units 104, 106 to the body 102, it may be desirable, however, to provide a system that enables the use of automated machinery, such as automatic torque wrenches, robots, and/or robotic carts, as discussed below. It may also be desirable for the system to "hide" the fasteners, such that they are not visible during normal use. It may also be desirable to attach the drive units 104, 106 to the body 102 without penetrating the passenger compartment. This can reduce water and air infiltration, reduce noise, reduce corrosion, and improve structural rigidity, among other things. It may also be desirable for the system to be able to insert, tighten, and torque the fasteners in a single step to improve efficiency, without the need for grommets, covers, or other accessories. It is to such a system that examples of the present disclosure are primarily directed.

To this end, a fastening system 108 can be used to horizontally couple the drive units 104, 106 to the body 102. As shown, the fastening system 108 can be attached to the drive units 104, 106 and can be substantially hidden from view in the assembled state. As mentioned above, the fastening system 108 can include one or more driveshafts, disposed vertically below the vehicle 100. The fastening system 108 can also include one or more spur gears, straight, spiral, or hypoid bevel gears, and related mechanisms to turn fasteners, with the fasteners disposed horizontally in the fastening system 108. In some examples, the fastening system can include worm drives due to their ability to transmit higher torque loads when compared to other gear types. This can enable the fastening system 108 to horizontally attach the drive units 104, 106 to the body (or vice-versa). The fastening system 108 can enable relatively conventional torquing devices, with vertical orientation, to be converted to improved modular, horizontal assembly procedures. In addition, the fastening system 108 and fasteners can be substantially hidden from view when assembled, obviating the need for additional steps or parts (e.g., seals or aesthetic covers).

As shown in FIG. 1B, in some examples, jack stands, blocks, or internal air or hydraulic jacks 110 can be used to support the body 100 when one or more of the drive units 104, 106 is removed. In other words, the vehicle 100 is normally supported on the wheels 112 in the assembled state. Thus, in some examples, the jacks 110 can be used to support the body 102 when the drive units 104, 106 are removed. In other examples, as discussed below with reference to FIGS. 6A-6C, a robotic cart 600 with a separable vehicle stand 604 can be used to support the body 102.

As shown in FIG. 2A, examples of the present disclosure can comprise a fastening system 108 for attaching subassemblies during vehicle production. The fastening system 108 can enable a first subassembly 202 (e.g., the drive units 104, 106, discussed above) to be attached to a second subassembly 204 (e.g., the body 102) with a plurality of fasteners 206 in a horizontal manner, such that the fasteners 206 are not visible in the installed position. As shown, in some examples, the fastening system 108 can be attached to the first subassembly 202 to enable the first subassembly 202 to be easily attached to the second subassembly 204, or vice-versa.

Figure 2B:
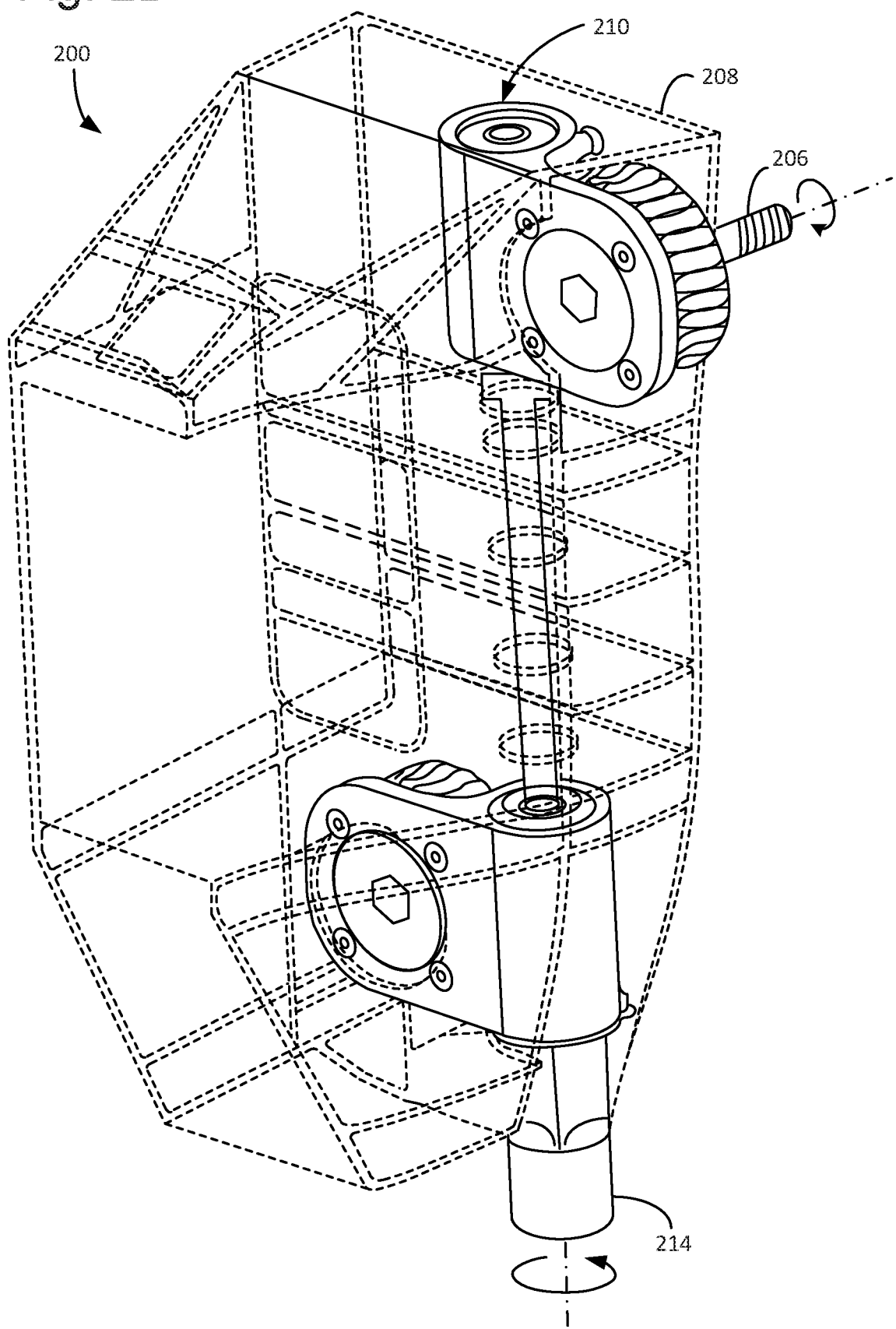
FIG. 2B is a partial cutaway view of the fastening system with the crash structure and drive system, in accordance with some examples of the present disclosure.

As shown in FIG. 2B, the fastening system 108 and can also comprise a housing 208 and a drive system 210. The housing 208 can comprise a casting or extrusion suitable to attach the fastening system 108 to one of the subassemblies 202, 204 and can house the drive system 210. When used on a vehicle 100, for example, the housing 208 may not only house the drive system 210, but may also act as part of the crash structure for the vehicle 100. Thus, the housing 208 can act as a crumple zone and can include internal structure, such as ribs 208a, for example, configured to deform in response to a predetermined crash force. This can enable the housing 208 to absorb crash energy, rather than transferring this energy to the vehicle 100. The housing 208 can be replaced separately to minimize repair costs.

In other example, the housing 208 can instead (or in addition) support a separate crumple zone or crash structure on a surface facing an external portion of the vehicle 100. Thus, additional crash structures can be bolted or bonded to an external surface of the housing 208, for example. This may prevent damage to the drive system 210 and other components, further reducing repair costs.

In some examples, as shown in FIG. 2A, the fastening system 108 can be attached to a subframe 212, such as a subframe for supporting the drive units 104, 106. Thus, the fastening system 108 can be used to attach the drive units 104, 106 to the body 102 (depicted more generically as subassembly 204). Though, as discussed above, the fastening system 108 is not so limited and can be used on other components of the vehicle 100, other vehicles, or other machines or components.

Thus, turning one or more driveshafts 214 on the drive system 210 can rotate a series of mechanisms to rotate one or more fasteners 206 to detachably couple the first subassembly 202 to the second subassembly 204. As shown, in some examples, the driveshaft(s) 214 can rotate a worm gear configured to change the direction of rotation from a first orientation (e.g., vertically below the vehicle 100) to a second orientation (e.g., horizontally to the ground). The fastening system 108 can include a variety of drive interfaces configured to interface with a variety of torquing devices. The fastening system 108 can also include a variety of fastener drives to tighten and loosen multiple types and sizes of fasteners.

In some examples, to aid installation, the fasteners 206 can be captured between the drive system 210 and the housing 208. In other words, the fastener 206 can pass through an aperture in the housing 208 that is sized to enable the shaft of the fastener to pass through, but not the head of the fastener 206. As discussed below, the fastening system 108 can then be spring-loaded to promote extension of the fastener 206 of the fastening system (e.g., the driven gear 308, discussed below) from the housing 208. In this manner, the fasteners 206 can remain with the fastening system 108 when the subassembly 202 is removed, for example, to prevent loss or damage. In addition, upon reassembly of the components 202, 204, the fasteners are readily available for installation and are constantly driven into a respective receiving assembly. In some examples, such a spring assembly may promote alignment of multiple fasteners 206 driven by the drive system 210. The spring assembly can also provide inward force on the fasteners 206 to ensure thread engagement upon reassembly. In some examples, as shown in FIG. 3B, below, the fastener 206 can also be tapered to provide additional alignment between the fastener 206 and the respective receiver in the subassembly 102, 104, 106.

Figure 3A:
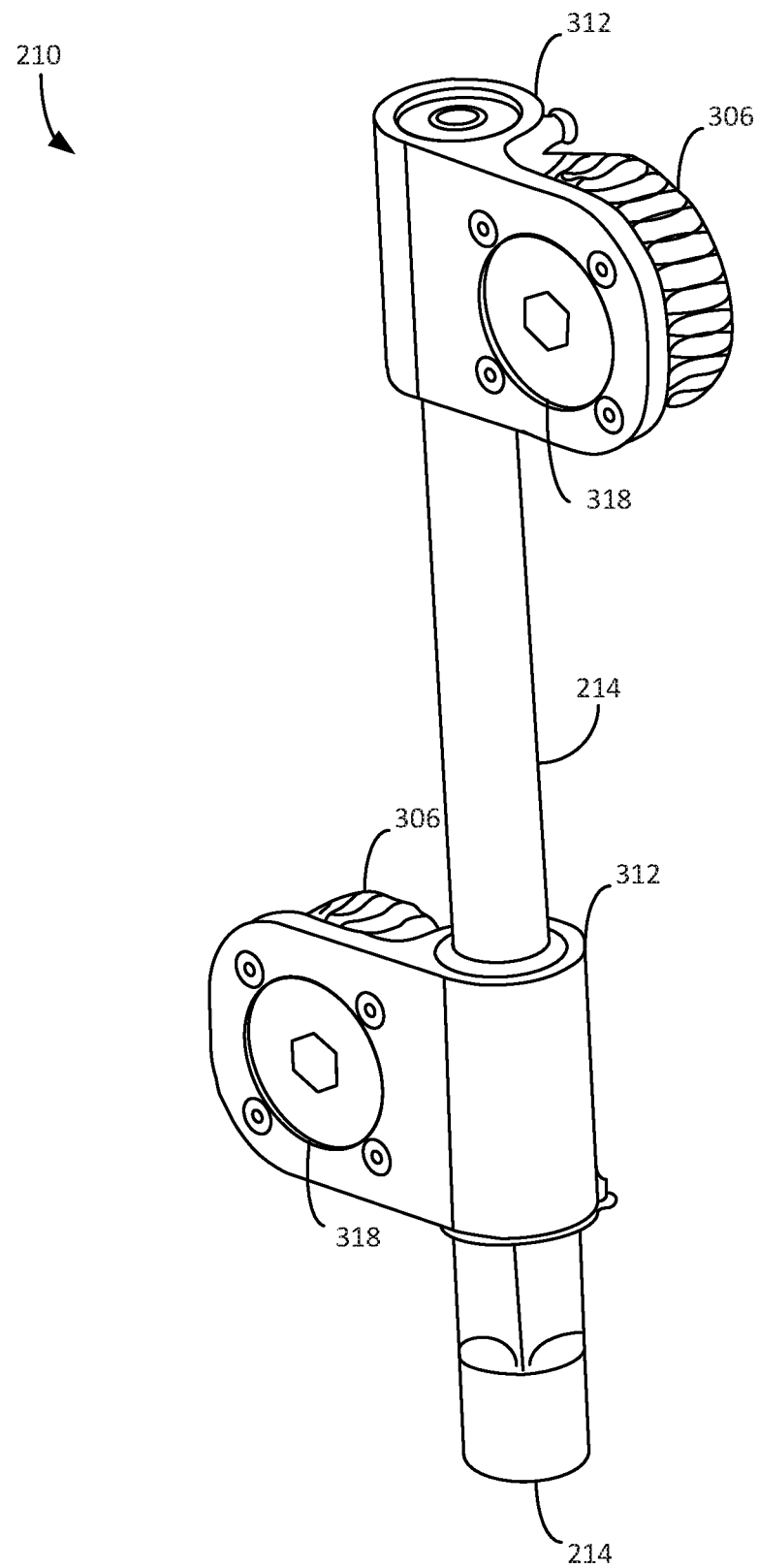
FIG. 3A is a rear perspective view of the drive system, in accordance with some examples of the present disclosure.
Figure 3B:
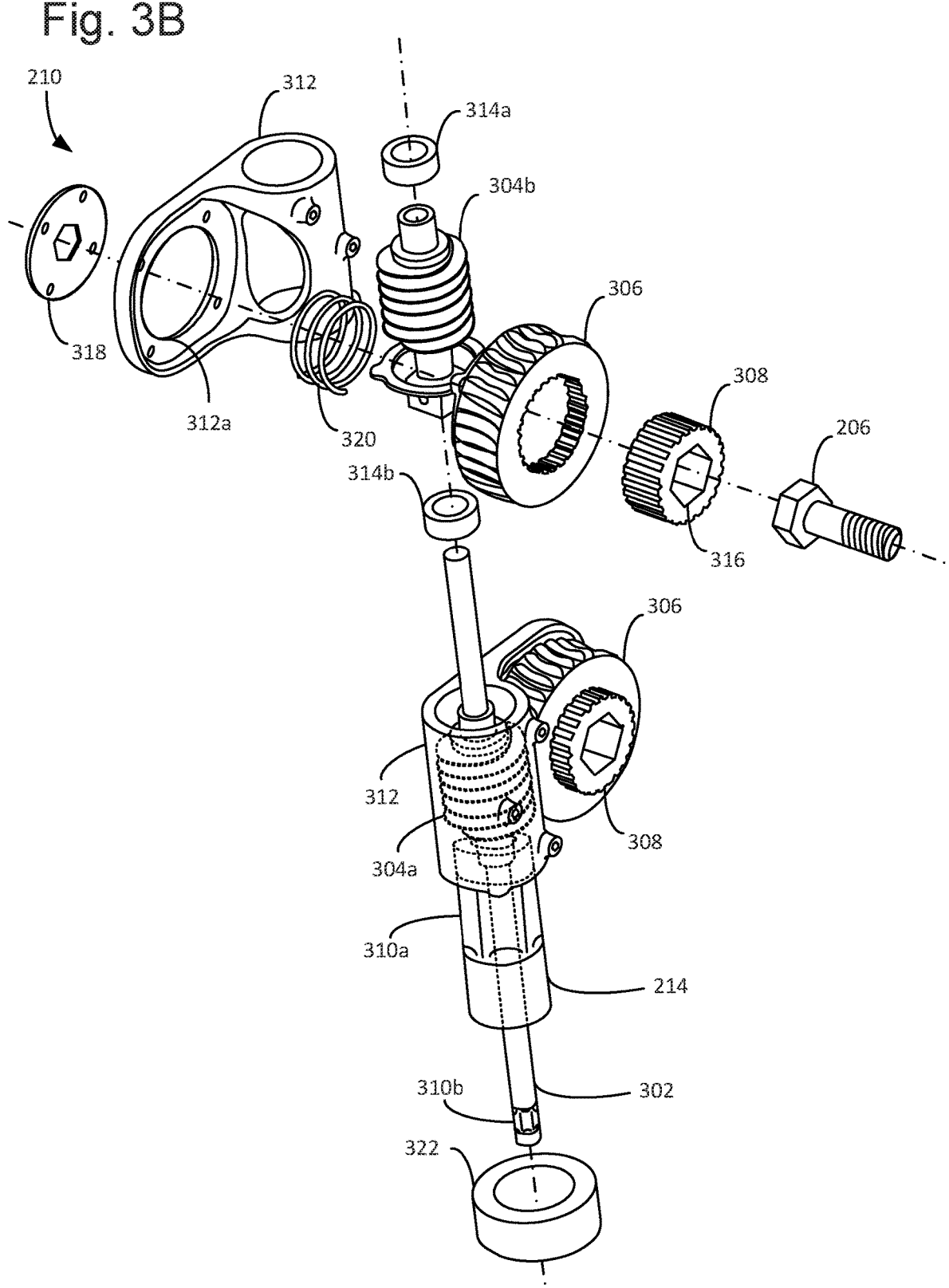
FIG. 3B is a front exploded, perspective view of the drive system, in accordance with some examples of the present disclosure.

As shown from the rear in FIG. 3A and from the front and exploded in FIG. 3B, the drive system 210 can comprise the first driveshaft 214, second driveshaft 302, worm shaft 304, worm gear 306, and driven gear 308 for each fastener 206. As shown in FIG. 3A, the drive system 210 contains provisions for two fasteners 206 (e.g., two sets of gears 304, 306, 308), but the fastening system 108 can be used with more or less fasteners 206 by adding or removing components.

As shown, the driveshaft(s) 214, 302 can be engaged with the worm shaft(s) 304 to enable the fasteners 206 to be tightened from an angle that is substantially perpendicular to the fastener 206. Thus, the driveshafts 214, 302 can be located vertically beneath (or above) the vehicle 100, with the fasteners 206 disposed in a substantially horizontal manner inside the fastening system 108. In other words, in the orientation shown in FIGS. 3A and 3B, the worm shaft 304 can covert rotary motion about the y-axis, for example, into rotary motion about the x-axis.

Thus, while tightening tools (e.g., torque wrenches) can be inserted into the driveshafts 302 in the conventional manner e.g., vertically from below the vehicle 100—the fasteners 206 can be tightened into the subassembly 204 horizontally. This enables the fasteners 206 to be located inside the housing 208 and, when tightened, inside the subassembly 204 such that they are substantially hidden from view. In addition, the use of a simple seal 322 (e.g., a lip seal, as shown in FIG. 3B) between the driveshaft(s) 214, 302 and the housing 208, for example, can enable the fasteners 206 to be substantially sealed from the elements. Thus, the fasteners 206 are hidden and protected without the need for additional steps or components during assembly, increasing productivity and reducing costs.

As shown in FIGS. 3A and 3B, when two fasteners 206 are employed, the drive system 210 can comprise one driveshaft 214 (FIG. 3A) or two driveshafts 214, 302 (FIG. 3B), two worm shafts 304, two worm gears 306, and two driven gears 308. In some examples, as shown in FIG. 3A, the drive system 210 can include a single driveshaft 214 coupled to both worm shafts 304 to enable both fasteners 206 to be tightened at the same time and with the same tool. This may be useful when fastener torque is less critical, for example, or when the conditions can be controlled such that each fastener 206 receives substantially the same fastening torque.

In other examples, as shown in FIG. 3B, the drive system 210 can include separate driveshafts 214, 302, one for each worm shaft 304. Thus, in this configuration, the outer driveshaft 214 can turn the lower worm shaft 304a, while the inner driveshaft 302 can turn the upper worm shaft 304b. In this manner, each fastener 206 can be independently tightened and torqued. In some examples, the driveshafts 214, 302 can be concentric such that an inner driveshaft 302 rotates inside an outer driveshaft 214. In this configuration, the driveshafts 214, 302 can also comprise separate drive interfaces 310a, 310b to enable each driveshaft 214, 302 to be driven independently.

As shown, in some examples, rather than using a single worm shaft 304 that spans a significant portion of the driveshaft's length, the drive system 210 can comprise a single, short worm shaft 304 for each fastener 206. In some examples, the drive system 210 can also include a drive housing 312 for each worm shaft 304. The drive housing 312 can be designed to not only house the drive system 210, but to act as a structural and/or crash member for the drive module 104 or vehicle 100.

The drive housing 312, in turn, can include one or more bushings or bearings 314 to reduce the flex of driveshaft(s) 302 proximate the worm shaft 304. Thus, the drive housing 312 can include an upper bearing 314a, disposed above the worm shaft 304, for example, and a lower bearing 314b disposed below the worm shaft 304. Of course, depending on the size of the drive system 210, more or less bearings 314 can be used.

The housing 208 can be shaped and sized to house drive system 210, which includes the worm shaft 304 and the worm gear 306. As shown, the housing 208 can comprise a substantially cylindrical portion to house the worm shaft 304 and a substantially circular portion to house the worm gear 306. The housing 208 may also include seals, grease fittings, and other components suitable to maintain and service the components 304, 306, 308 of the drive system 210.

The combination of the bearings 314, drive housing 312, and worm shafts 304 can substantially eliminate flexing of the worm shafts 304 with respect to the worm gears 306. This reduces friction and wear on both gears 304, 306. This also enables more accurate torque measurement when torquing the fasteners 206 during assembly. This configuration also enables the driveshafts 302 (as opposed to the worm shafts 304) to be somewhat flexible since they are not required to locate the worm shafts 304. In this manner, slight misalignments between the driveshafts 302 and any drive tools (e.g., a robotic torque wrench) can be absorbed by the driveshafts 302, further reducing wear on the gears 304, 306. Thus, while a slight misalignment between a torque wrench and the drive system 210 may cause one, or both driveshafts 214, 302 to bow slightly, for example, the alignment between the worm shafts 304 and the worm gears 306 is maintained.

As shown, the worm gear 306 can be rotated by the worm shaft 304, while the driven gear 308 can be turned by the worm gear 306. Thus, the worm gear 306 can comprise a complementary tooth pattern to the worm shaft 304 to turn the direction of rotation of the driveshafts 214, 302 through approximately 90 degrees. The worm gear 306 can also comprise internal teeth suitable to engage with the external teeth of the driven gear 308. As briefly noted above, such a worm gear combination may enable high torques to be transferred, though other suitably sized gear configurations could also be used.

Thus, the driven gear 308 is turned by the worm gear 306 and, in turn, turns the fastener 206. To this end, the driven gear 308 can include an interface 316 to rotate, tighten, and torque the fasteners 206. As shown, in some examples, the interface 316 can simply comprise and appropriately sized hole in the driven gear 308 (e.g., a hex, 8-point, or 12-point "socket"). In other examples, as discussed below, the driven gear 308 can include an insert, or adapter, to enable a single type or size of driven gear 308 to be adapted to multiple types and sizes of fasteners 206. In still other examples, to reduce complexity, the worm gear 306 can drive the fastener 206 directly obviating the need for the driven gear 308.

In some examples, to facilitate maintenance and repair, the drive system 210 can also comprise a removable cover 318 and a spring 320. As shown, in some examples, the cover 318 can be removable to provide access to the worm gear 306, driven gear 308, and other fastening system 108 components. This can enable the components 304, 306, 308 to be inspected, cleaned, lubricated, and/or replaced without completely disassembling the drive system 210 (or the fastening system 108 or removing it from the vehicle 100). In addition, in the event of a failure of the drive system 210 such as, for example, a broken gear 304, 306, 308 or a jammed or cross-threaded fastener 206, the cover 318 and spring 320 can be removed from the rear of the fastening system 108. Once removed, the worm gear 306 and/or driven gear 308, for example, can also be extracted through an appropriately sized aperture 312a in the drive housing 312 to enable the drive system 210 to be serviced in situ.

Significantly, in some examples, the driven gear 308 can be removed through the aperture 312a to enable a manual socket to be inserted through the drive housing 312 and the worm gear 306. Thus, a manual ratchet or wrench can be used to extract the fastener 206, for example, for replacement and/or drive the fastener 206 directly into or out of the respective receiving region. This may be because the fastener 206 is damaged, cross-threaded, corroded, or has simply reached the end of its service life (i.e., it has been retorqued a predetermined number of times. Thus, the fastener 206 can be removed and replaced without removing the fastening system 108 from the vehicle 100 and without disturbing the setup (e.g., backlash) between the worm shaft 304 and worm gear 306. In addition, the drive unit 104, 106 can be removed from the vehicle 100, for example, despite a mechanical failure.

Figure 4A:
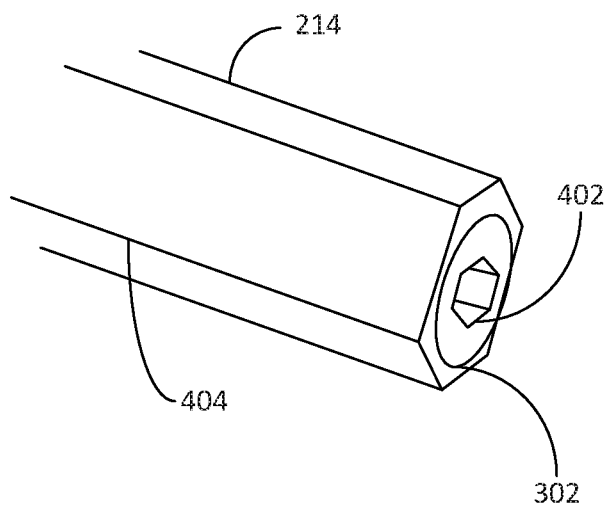
FIG. 4A depicts a drive interface with an internal drive interface and an external drive interface, in accordance with some examples of the present disclosure.

As shown in FIG. 4A, in some examples, the ends of the driveshafts 214, 302 can be substantially coplanar. In this configuration, to enable each driveshaft 214, 302 to be turned separately, the inner driveshaft 302 can comprise an internal drive interface 402 such as, for example, an internal hex (e.g., Allen®), internal Torx®, square drive, or another type of internal drive interface 402, while the outer driveshaft 214 can comprise an external drive interface 404, such as an external hex, external 12-point, or another external drive interface 404. This may enable a dual (concentric) torque wrench, for example, to tighten both fasteners 206 separately, but at the same time. In addition, this configuration can shorten the overall length of the driveshafts 214, 302 and thus, the drive system 210. In other words, the internal drive interface 402 enables the inner driveshaft 302 to be turned even though the internal driveshaft 302 and external driveshaft 214 terminate at the same point (i.e., they are not the same length, but their ends are flush), reducing the overall length required for the driveshafts 214, 302.

Figure 4B:
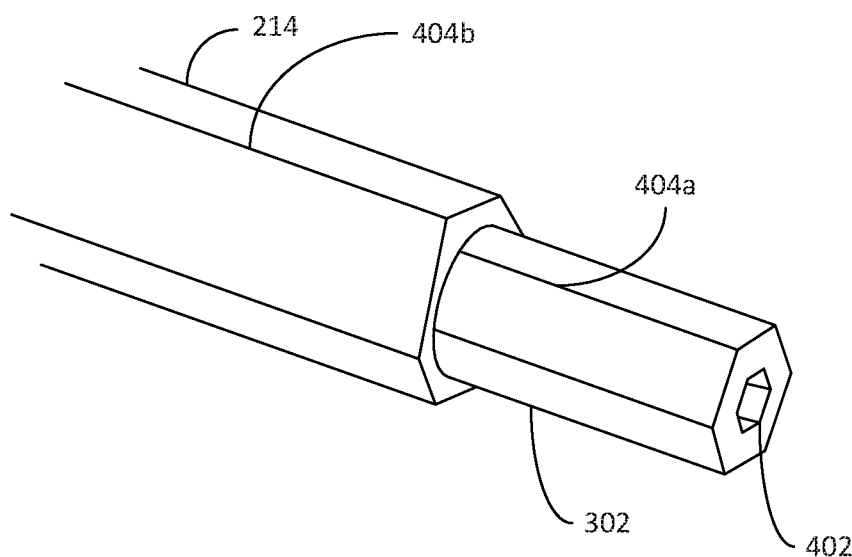
FIG. 4B depicts a drive interface with two external drive interfaces, in accordance with some examples of the present disclosure.

As shown in FIG. 4B, in other examples, both driveshafts 302 can comprise external drive interfaces 404, with the inner driveshaft 302 being longer than the outer driveshaft 214 to enable access to both drive interfaces 404. In this configuration, the first drive interface 404a for the inner driveshaft 302 can comprise a smaller, external hex or 12-point, for example, which can be turned with a smaller, standard depth socket. The second drive interface 404b for the outer driveshaft 214, on the other hand, can comprise a larger, external hex or 12-point, for example, which can be driven with a larger, deep socket. Regardless, the separate driveshafts 214, 302 can enable each fastener 206 to be tightened and torqued independently, if desired. In some examples, the inner driveshaft 302 can also include an internal drive interface 402 to provide redundancy and/or improved access, as necessary.

Figure 4C:
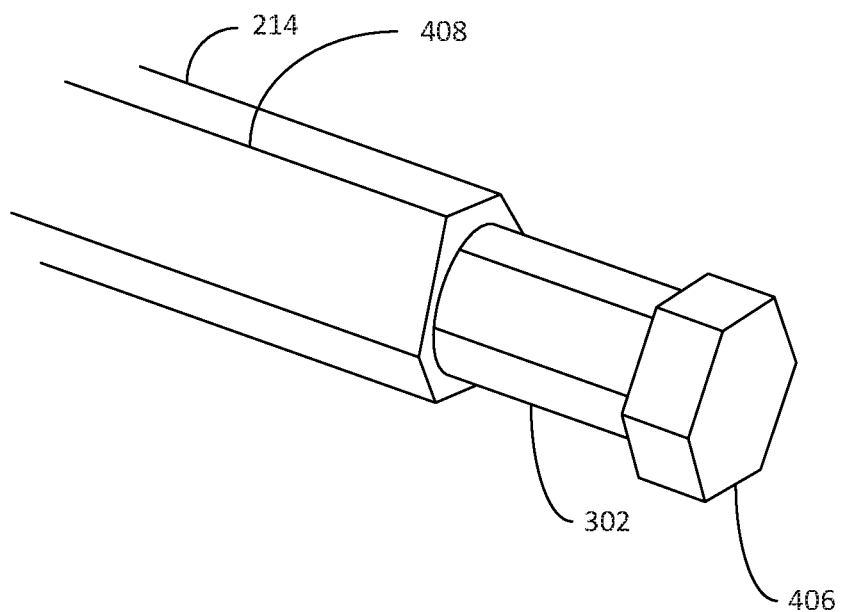
FIG. 4C depicts another drive interface with two external drive interfaces of the same size, in accordance with some examples of the present disclosure.

As shown in FIG. 4C, in other examples, the inner driveshaft 302 and the outer driveshaft 214 can have the same size external interface 404b, 406. In this configuration, the first drive interface 406 for the inner driveshaft 302 can comprise the same size external hex or 12-point, for example, which can be turned with the same socket or driver as the outer drive shaft 214. Thus, both the first drive interface 406 and the second drive interface can be driven with the same, deep socket. This can be used when there is an acceptable range of torques for each fastener 406 (e.g., less precision is required) or by adjusting the length or thread pitch of the fasteners 406, for example, to achieve the desired torques.

Figure 5A:
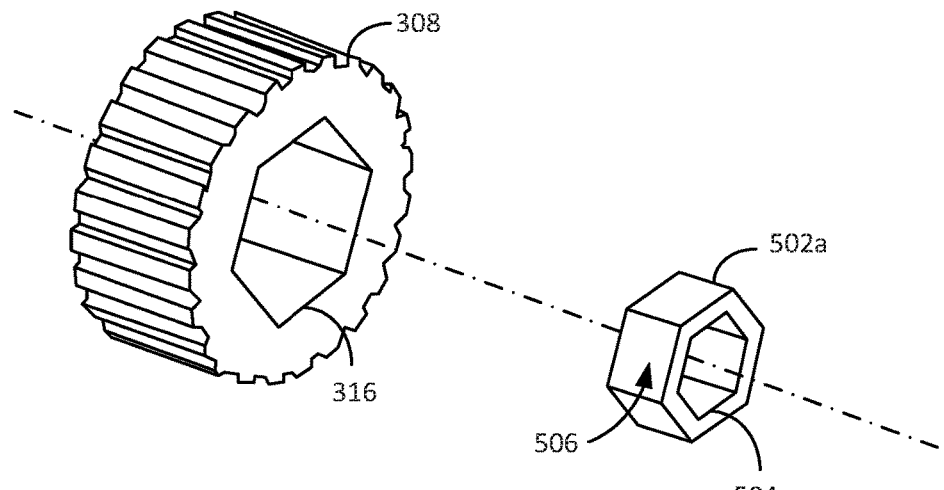
FIGS. 5A-5C depict driven gears with large internal, small internal, and external fastener inserts, respectively, in accordance with some examples of the present disclosure.
Figure 5B:
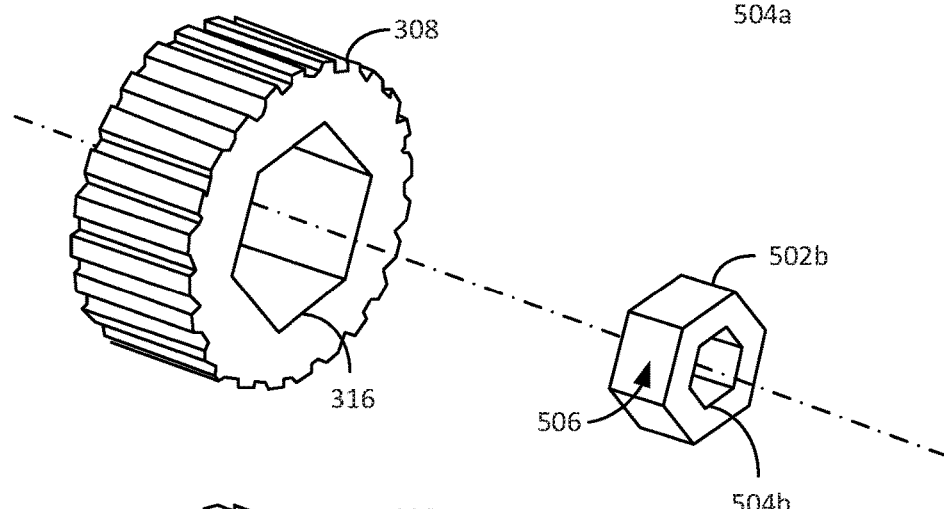
Figure 5C:
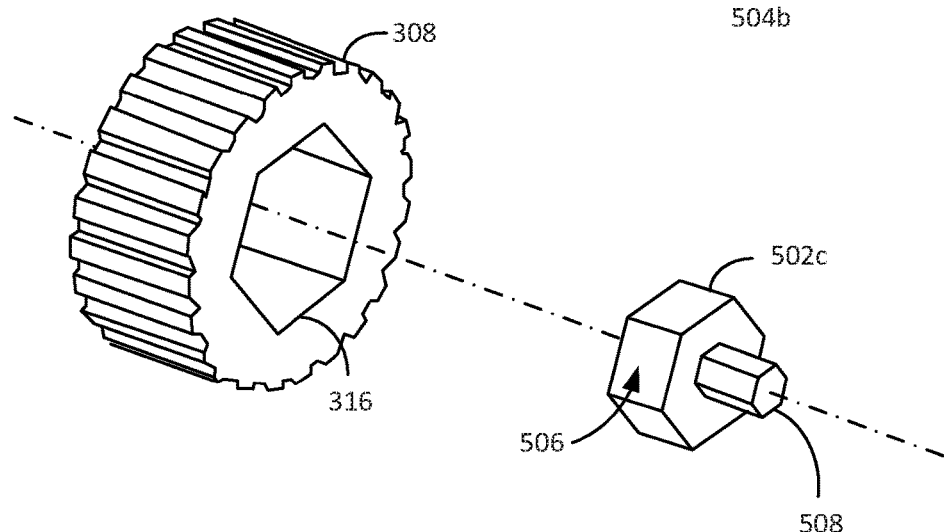

As mentioned above, in some examples, the interface 316 molded directly into the driven gear 308 can turn the fasteners directly. In other examples, the interface 316 can be molded directly into the worm gear 306, obviating the need for the driven gear 308 (though this may affect serviceability). In still other examples, as shown in FIGS. 5A-5C, the driven gear 308 can include a fastener insert 502, disposed inside the interface 316, to adapt the driven gear 308 to a variety of fastener sizes and/or types. Thus, the interface 316 of the driven gear 308 can comprise, for example, a hex (shown), 12-point, spline, or other drive to couple with the fastener insert 502. The fastener insert 502, in turn, can comprise a fastener drive 504, 508 configured to rotate a fastener and can include a complementary external surface 506 e.g., sized and shaped to fit inside the interface 316.

Each fastener insert 502 can comprise a fastener drive 504 sized and shaped to rotate a specific size and type of fastener. Thus, the fastener inserts 502 can comprise, for example, external fastener drives 504a, 504b (FIGS. 5A and 5B, respectively) for external fasteners like hex bolts. The fastener inserts 502 can also comprise internal fastener drives 508 (FIG. 5C) for internal fasteners like Allen® or internal Torx® bolts.

As shown, a large fastener insert 502a can include a large, external fastener drive 504a for turning large, external fasteners (e.g., large hex bolts). Similarly, a small external fastener insert 502b can include a small, external fastener drive 504b to turn smaller external fasteners (e.g., small hex bolts). Thus, while the fastener inserts 502a, 502b are externally the same size and configured to fit inside the driven gear 308, the fastener drives 504 can be different sizes for different sized fasteners.

In addition, as shown in FIG. 5C, the fastener insert 502c can also comprise an internal fastener drive 508 to drive internal fasteners in this case an Allen® bolt. Thus, the internal fastener drive 508 can be sized and shaped to fit different sized (e.g., ¼", ½", 5 mm, 6 mm, 7 mm, etc.) and different style (e.g., Torx®, Allen®, splined, square drive, star, flat head, Phillips, etc.) internal fasteners. Thus, by simply changing out the fastener inserts 502, the fastening system 108 can be adapted to different sizes and types of fasteners.

This modular configuration can also enable the driven gear 308 and the fastener insert 502 to be made of different materials to, for example, reduce fastener damage, improve wear characteristics, reduce friction, and/or reduce noise. Thus, the fastener insert 502 can comprise nylon, for example, or another softer material to substantially prevent any coatings (e.g., zinc chromate) on the fastener from being removed during tightening and removal procedures. Thus, the fastener insert 502 can comprise a polymer, for example, while the driven gear 308 can comprise a metal. The fastener insert 502 can also comprise a hard material to reduce wear on the fastener insert 502, while enabling a softer material to be used for the driven gear 308 to reduce wear on the drive gear 306. Other combinations are also possible.

This configuration can provide additional modularity. In other words, the driven gear 308 can be a standard size with a standard sized interface 316. The fastener inserts 502, in turn, can each comprise a standard external surface 506 and a different sized fastener drive 504, or "socket," for a specific size and/or style of fastener. So, for example, the large fastener insert 502a can comprise a 12 mm fastener drive 504a and the small fastener insert 502b can comprise an 8 mm fastener drive 504b. Of course, these sizes a purely exemplary and other sizes are possible. Indeed, as mentioned above, the fastener inserts 502 can also comprise either external drives (hex, 12-point, etc.) or internal drives (e.g., Allen®, Torx®, etc.), as desired.

In this manner, the fastening system 108 can be substantially standardized and can be used on vehicles 100 with multiple sizes or styles of fasteners 206 or on multiple different types of vehicles serviced in the same facility. In some examples, the fastening system 108 can include multiple sizes suitable to service a range of fastener sizes. In other words, the fastening system 108 can include, for example, a small, medium, and large size, with each fastening system 108 suitable to a range of fastener sizes (e.g., 4-8 mm, 10-12 mm, and 14-16 mm, respectively). Thus, each fastening system 108 includes appropriately sized (and torque rated) components 214, 302, 304, 306, 308 and a plurality of fastener inserts 502 sized and shaped for the range of covered fasteners 206.

Figure 6C:
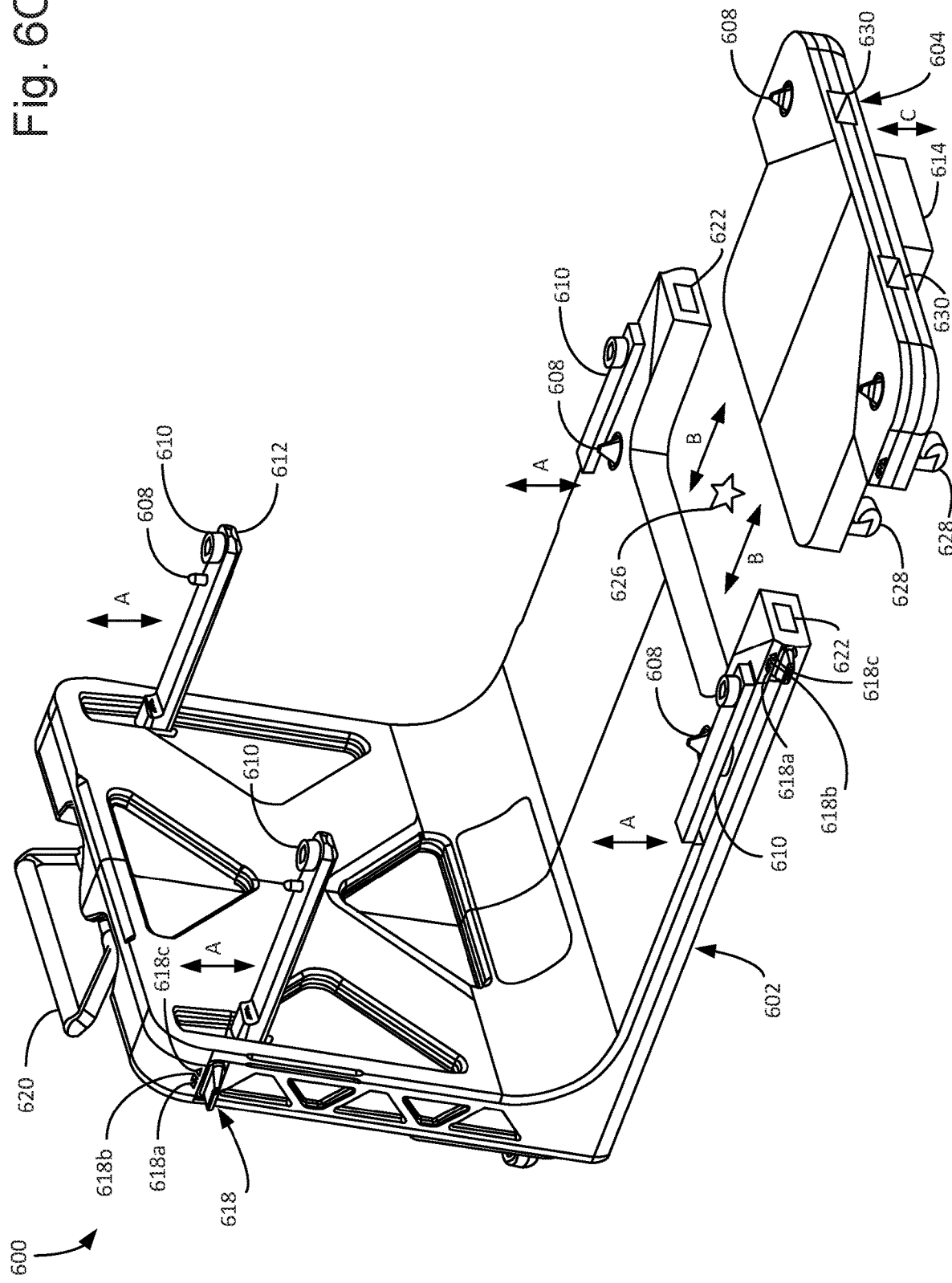
FIG. 6C is a perspective view of the robotic cart for use with the fastening system with a vehicle support shown separated, in accordance with some examples of the present disclosure.

As shown in FIGS. 6A-6C, the fastening system 108 can be used in conjunction with a robotic cart 600. Thus, the robotic cart 600 can be used, for example, to remove the subassemblies 104, 106 from the body 102 for maintenance and repair, among other things. The robotic cart 600 can comprise, for example, a main body 602 and a vehicle stand 604. The main body 602 can comprise, for example, one or more drive systems 606, each comprising one or more motors/transmissions, and a plurality of wheels, rollers, casters, or another suitable component.

The drive systems 606 can comprise any type of motor suitable to move the cart 600 and/or the subassemblies 104, 106 throughout a service facility, for example, or an assembly plant. In some examples, the drive systems 606 can comprise for example, direct drive electric motors (i.e., without using transmissions), electric motors acting through transmissions, servo motors, or another type of electric motor. In other examples, the drive systems 606 can comprise pneumatic or hydraulic motors power by a pump that is itself driven by a central electric motor, internal combustion engine, fuel cell, etc.

Regardless, the main body 602 can comprise one or more docking pins 608 and one or more torquing devices 610. The torquing devices 610 can comprise any of a variety of automated/robotic torque-controlled screwdrivers and nutdrivers, such as those commonly used on vehicle assembly lines. The docking pins 608 can comprise pins, cups, latches, or other suitable interface to enable the cart 600 to securely lift and move the drive units 104, 106. Thus, in some examples, the docking pins 608 can simply comprise pins, for example, that are sized and shaped to be inserted into complementary holes in the drive units 104, 106. In other examples, the docking pins 608 can comprise cups or holes, for example, into which complementary hemispheres or pins in the drive units 104, 106 can be received. The docking pins 608 and their respective complementary receiving portions on the drive units 104, 106 may be sized and shaped to promote alignment. Thus, the docking pins 608 can serve to locate, align, and/or provide fixturing between, for example, the cart 600 and the vehicle 100.

The main body 602 can also comprise one or more torquing devices 610 configured to interface with the fastening system 108. Thus, the torquing device 610 can comprise, for example, a mechanical or electronic torque wrench configured to tighten and loosen the fasteners 206 to enable the drive units 104, 106 to be installed and removed from the vehicle 100. The torquing devices 610 can comprise automatic electric or hydraulic torque wrenches, for example, configured to tighten the fasteners 206 to one or more preset tightening torques or torque-to-yield (TTY) settings. The torquing devices 610 can also be used to loosen the fasteners 206 to enable the drive units 104, 106 to be removed.

As mentioned above, in some examples, the fastening system 108 can comprise multiple driveshafts 302 to enable the fasteners 206 to be tightened, loosened, and torqued independently. In this configuration, the torquing device 610 can comprise complementary torque wrenches. So, for example, in the case of concentric driveshafts 214, 302, discussed above, the torquing device 610 can include a first torque wrench for the inner driveshaft 302 and a second torque wrench for the outer driveshaft 214, with the appropriate tool on each torquing device 610 for the respective driveshaft 302. Of course, in some examples, the torquing device 610 can include a single torque wrench with multiple heads, concentric heads, or other devices, for this purpose.

In some examples, the torquing devices 610 can be moved in one or more axis to enable the torquing devices 610 to be aligned with the driveshafts 214, 302. The torquing devices 610 can be moved back and forth or side-to-side, for example, to center the torquing devices 610 on the driveshafts 214, 302. The torquing devices 610 can also be moved vertically from a lowered position (FIG. 6A) to a raised position (FIG. 6C) to enable the cart 600 to engage with the driveshafts 214, 302.

In some examples, the cart 600 can also include an upper stanchion 612 including one or more additional docking pins 608. As before, these docking pins 608 can be, for example, pins, cups, latches, or other devices suitable to engage with the drive units 104, 106. The upper stanchion 612 can support an upper portion of the drive units 104, 106 to substantially prevent the drive units 104, 106 from rolling, tipping, or otherwise falling, off the cart 600. This can provide additional security when the cart 600 removes, installs, and transports the drive units 104, 106 during operation.

In some examples, such as for vehicles 100 with moveable suspensions, the upper stanchions 612 can be fixed. In this configuration, the cart 600 can be positioned under the vehicle 100 with the docking pins 608 aligned with the pickup points on the vehicle 100. The vehicle 100 can then alter its suspension to first provide clearance for the cart 600 and then lower onto the cart 600.

In other examples, such as for vehicles 100 with fixed suspensions, the upper stanchions 612 can be moveable. The upper stanchions 612 can be mounted on actuators 612a such as, for example, pneumatic or hydraulic rams, linear actuators, or screw drives to enable the cart 600 to lift the vehicle 100. In this configuration, the cart 600 can be positioned under the vehicle 100 with the docking pins 608 aligned with the pickup points on the vehicle 100 and the upper stanchions 612 can be moved from a lowered position (FIG. 6C) to a raised position (FIG. 6A), as shown by Arrow A, to raise the vehicle 100 off the ground.

In some examples, the upper stanchions 612 can also include additional torquing devices 610. Thus, raising the upper stanchions 612 can enable the torquing devices 610 to engage with fasteners 206 on the drive module 104, 106 or other subassemblies. Of course, while shown vertically oriented, in some examples, the torquing devices 610 can be disposed horizontally on the ends of the upper stanchions 612 to tighten horizontal fasteners 206.

The cart 600 can also include the vehicle stand 604. As shown in FIG. 6C, the vehicle stand 604 can be detachable from the main body 602, as shown by Arrow B, and can support the vehicle 100 when one, or both, of the drive units 104, 106 is removed. To this end, the vehicle stand 604 can include one or more docking pins 608 and a foot 614. As before, the docking pins 608 can be, for example, pins, cups, latches, or other devices, but in this case, can be suitable to engage with complementary pickup points on the body 102 (i.e., as opposed to the drive units 104, 106). In other words, because the body 102 is normally supported by the wheels of the vehicle 100, when a drive unit 104, 106 is removed, it may be necessary to support the body 102 until a drive unit 104, 106 is reinstalled.

In some examples, such as when the cart 600 is used on vehicles 100 with active suspensions, the foot 614 can be a simple pin or bar. Thus, the cart 600 can move under the vehicle 100, the vehicle 100 can alter its suspension (lowering the vehicle 100 onto the cart 600), and the vehicle 100 can simply rest on the vehicle stand 604. In this configuration, as the cart 600 removes the drive unit 104, 106 from the vehicle 100, the vehicle stand 604 can detach from the cart 600 to support the vehicle 100. When the cart 600 returns with the drive unit 104, 106 (or a replacement drive unit 104, 106), the drive unit 104, 106 can be reinstalled and the suspension altered to raise the vehicle 100 off of the cart 600. The vehicle stand 604 can then be reattached to the cart 600 for removal to another location. This process is described in more detail below with respect to FIGS. 7A and 7B.

In other examples, such as on vehicles 100 with conventional (non-active) suspension systems, the foot 614 can comprise, for example, a hydraulic, pneumatic, or electric jack to enable the vehicle 100 to be lifted to remove the drive units 104, 106. Thus, as shown in FIG. 6C, for example, the foot 614 can move vertically, as shown by Arrow C, up and down from a retracted position (FIG. 6A) to an extended position (FIG. 6C) to support the body 102. In some examples, the vehicle stand 604 and foot 614 can be substantially self-contained. In other words, the vehicle stand 604 can comprise an internal battery and the foot 614 can comprise an electric jack to raise the vehicle. In this manner, fewer, or no, connections are needed between the main body 602 and the vehicle stand 604. In this configuration, the main body 602 and vehicle stand 604 may nonetheless be wirelessly connected (e.g., using Bluetooth® or Wi-Fi) to enable signaling between various components.

In other examples, the cart 600 can comprise, for example, electrical, pneumatic, and/or hydraulic (e.g., "drybreak") connections between the cart 600 and the vehicle stand 604 to enable the cart 600 to power the vehicle stand 604, yet enable the vehicle stand 604 and cart 600 to separate. Thus, the cart 600 can position itself under the vehicle 100, the foot 614 can extend, and the cart 600 can disconnect from the vehicle stand 604. The cart 600 can then remove the drive unit 104, 106 from the vehicle 100 for service, repair, or replacement, leaving the body 102 resting on the vehicle stand 604 (and foot 614).

In still other examples, the cart 600 can include a moveable suspension. In this configuration, the drive system 606, for example, can be mounted on an actuator to enable the cart 600 to be moved up and down. The drive system 606 can be mounted on airbags, for example, or linear actuators to move between a lowered position and a raised position. In this manner, the cart 600 and the foot 614 can both lift the vehicle 100 to a predetermined height to enable the drive unit(s) 104, 106 to be removed.

The cart 600 can also include a propulsion control system 616 and a plurality of sensors 618 to enable the cart 600 to properly locate the vehicle 100, position itself under the vehicle 100, locate the drive interfaces 310, and locate any pickup points on the vehicle 100, etc. The sensors 618 can include, for example, one or more image sensors 618a, radio distance and ranging (RADAR) sensors 618b, and/or laser distance and ranging (LIDAR) sensors 618c mounted on the cart 600. The sensors 618 can also comprise a global positioning system (GPS), inertial measurement unit (IMU), accelerometers, gyrometers, and other sensors. The sensors 618 can be arranged in a predetermined pattern, for example, in order to provide a desired area of coverage for the area proximate, and under, the vehicle 100. In some examples, as shown, the sensors 618 can be disposed in a pattern that enables approximately 360-degree coverage around the cart 600. This can enable the cart 600 to detect objects regardless of which direction the cart 600 is traveling (e.g., to, or from, the vehicle 100). This can also enable the cart 600 to detect objects approaching from the sides of the cart 600 (e.g., another cart 600 or a worker in a service facility). Other patterns and arrangements of the sensors 618 are contemplated.

The image sensors 618a may be any known types of digital image sensors, digital or analog cameras, and/or digital or analog video cameras. The image sensors 618a may be high dynamic range (HDR) cameras, for example, to provide improved accuracy of the images. In some examples, the image sensors 618a may include one or more of light-sensitive cameras, range sensors, tomography devices, RADAR, and/or ultra-sonic cameras. Other suitable types of imagers are contemplated. The imager sensors 618a may be selected to provide two-dimensional (2-D) image data, two and a half-dimensional (2.5d, or depth maps), and/or three-dimensional (3D) image data, image sequences, gray scale (or intensity) image data, and/or color image data. In some examples, the imager sensors 618a may be selected to provide depth data, absorption data, and/or reflectance data.

As shown, the example sensors 618 may be mounted to a portion of the cart 600 that provides a line-of-site view of a portion of the area around the cart 600, with at least a portion of the sensors 618 pointed in, or moveable to, the direction of travel and at least a portion of the sensors 618 pointed in, or moveable to, the upward-looking position. This can enable the cart 600 to safely travel through a maintenance facility, for example, and to properly position itself underneath the vehicle 100 for maintenance. The sensors 618 may be located separately from one another and on different parts of the cart 600, as shown, or incorporated into one or more sensor arrays.

The sensors 618 can enable the cart 600 to position itself properly underneath the vehicle 100, among other things. To this end, the vehicle 100 and/or surrounding environment can include fiducials configured to be identified by the sensors 618. In some examples, the pickup points on the vehicle 100 and/or disposed about the environment of the vehicle, can include bar codes, artificial reality tags, QR codes, retroreflectors, etc., for example. In some examples, sensor fusion (e.g. using SLAM, Kalman filters, bundle adjustment, etc.) to predict a pose of the cart 600 can be used to accurately localize the cart 600 and plan a trajectory to mate with the vehicle 100. In other examples, the image sensors 618a can be used to identify the pickup points and other features of the vehicle 100 for this purpose. The process of localizing the cart 600 is described in more detail below with reference to FIGS. 7A, 7B, and 8.

In some examples, rather than being robotic, the cart 600 can be controlled by a worker using a remote control or a handle 620 on the cart. The handle 620 can act as a joystick, for example, to enable the worker to maneuver the cart 600 into place under the vehicle 100. In some examples, the sensors 618 can include lights to indicate which way the cart 600 needs to be moved to align with the vehicle 100 or a fiducial. In other examples, the cart 600 can include an LCD screen, or other display, to provide directions to the worker.

The cart 600 can also comprise a torque control system 622. The torque control system 622 can provide control for the positioning and operation of the torquing devices 610. The torque control system 622 can receive various sensor inputs to enable the torquing devices 610 to be centered on the driveshafts 214, 302 and then raised into engagement. The torque control system 622 can also control the torque applied through the drive system 208 by the torquing devices 610. Thus, the torque control system 622 can receive inputs from torque sensors, position encoders, and other sensors to provide the desired torque on the fasteners 206.

The torque control system 622 can also ensure the fasteners 206 are properly removed during disassembly. This can be achieved by detecting a torque spike, for example, to "break the fastener 206 loose" followed by a predetermined number of turns on the fastener 206. Thus, the torque control system 622 may turn the fastener 406 eight times (or whatever number is required) to remove the fastener 406, plus another two turns to ensure the fastener 406 is completely removed.

As shown in FIG. 6C, in some examples, the vehicle stand 604 can be detachably coupled to the main body 602 using one or more latches 622. In some examples, the latches 622 can comprise, for example, mechanical latches. Thus, the latches 622 can comprise, for example, screw drives, cam locks, retractable hooks, or other mechanism suitable to mechanically couple the vehicle stand 604 to the main body 602. In other examples, the latches 622 can comprise electronic latches such as, for example, electromagnets, linear actuators, screw drives, etc. In either case, the latches 622 can be remotely activated to enable the cart 600, the vehicle 100, or a central control to provide a signal to cause the vehicle stand 604 to couple to, or decouple from, the vehicle 100.

In some examples, one or more fiducials 624 can be placed on the ground in the service area. For automated vehicles, for example, the vehicle 100 can positioning itself over the fiducial 624 for service. The cart 600 can then position itself using the fiducial 624. In this manner, the cart 600 and the vehicle 100 can be properly located using the same frame of reference. The cart 600 can position itself (or a sensor 618) over the fiducial 624, for example, and then engage with the vehicle 100.

In some examples, the vehicle stand 604 can also include a plurality of casters 626, rollers, wheels, or other device to enable the vehicle 100 to be moved when one, or both, of the drive modules 104, 106 is removed. The drive modules 104, 106 may be removed to recharge or replace batteries, for example, while the body 102 may be wheeled into the body shop to repair dents or dings obtained during use. The casters 626 can enable multiple repairs to be provided at the same time, among other things.

In some examples, the vehicle stand 604 can also comprise one or more lifting points 628. The lifting points 628 can enable the body 102 to be safely lifted with a crane or other device to enable the body to be moved, lifted, and/or rotated to facilitate service. In some examples, the vehicle stand 604 can include two lifting points sized and shaped to accept, for example, the tines of a forklift for easy maneuvering.

Figure 7B:
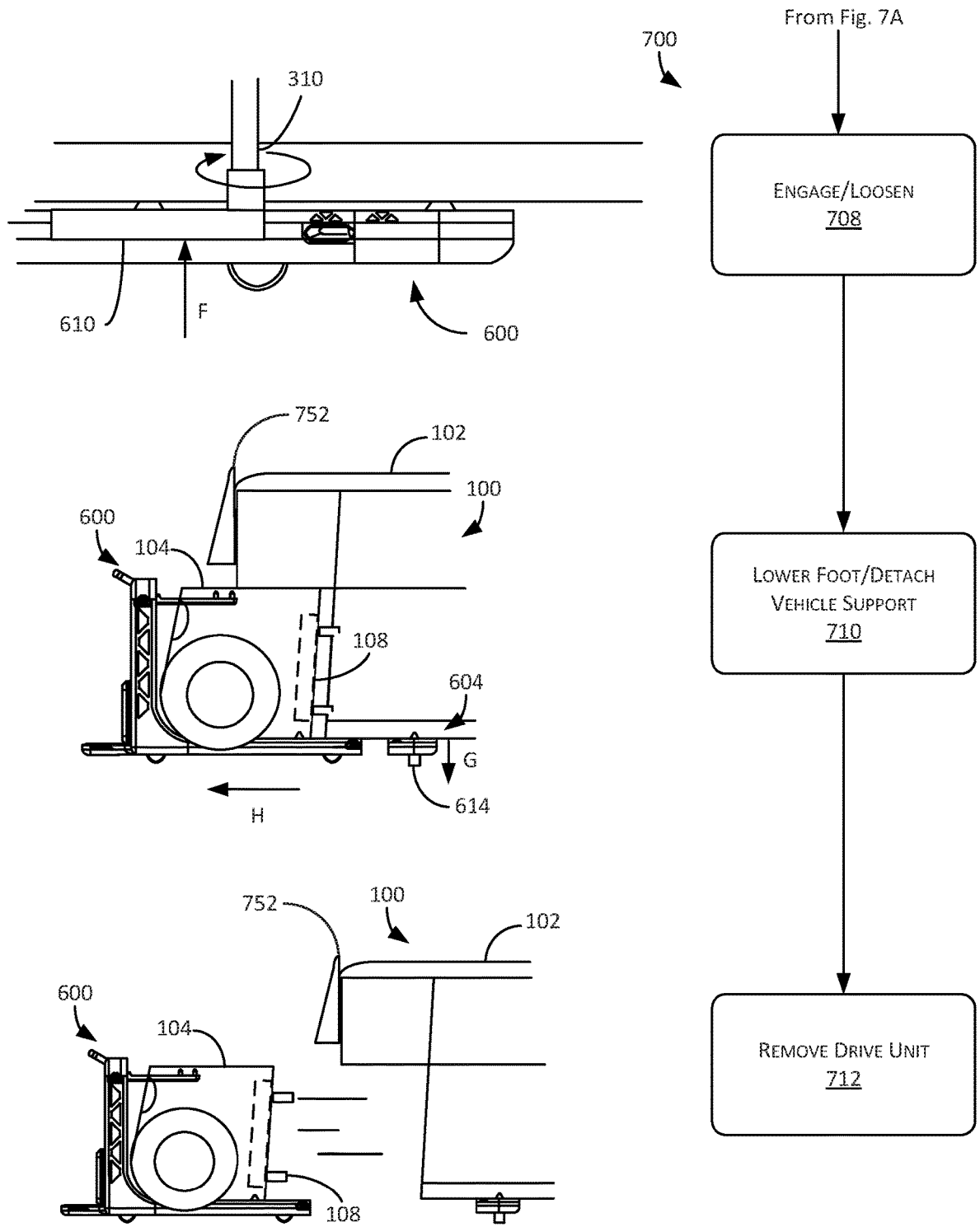

As shown in FIGS. 7A and 7B, examples of the present disclosure can also comprise a method 700 of using the fastening system 108 in conjunction with the robotic cart 600. The cart 600 can be used to remove and replace drive units 104, 106 for maintenance operations, battery swaps, and reconfigurations, among other things. Thus, and in general, the cart 600 can approach the vehicle 100, align with the vehicle 100 and drive unit 104, 106, remove or decouple the fasteners 206, and then remove the drive unit 104, 106 from the vehicle 100. For modular vehicles 100, the cart 600 can then replace the same drive unit 104, 106 (e.g., after service or repair), for example, or replace the drive unit 104, 106 with a new drive unit 104, 106 that has already been recharged, serviced, or repaired.

At 702, therefore, the cart 600 can approach the vehicle 100 and position itself in the appropriate location proximate a first end 750 of the vehicle 100. So, for example, the cart 600 can approach the vehicle 100 using one or more of the sensors 618 to determine its position relative to the vehicle 100. Once the cart 600 is with a predetermined distance from the vehicle 100 (e.g., 3 or 5 feet), the cart 600 can reduce its speed for final positioning.

In some examples, the cart 600 can, at least partially, be manually positioned. In other words, rather than being entirely robotic, the cart 600 can be manually pushed into place by a worker, for example, or controlled by a worker with a remote control. In this configuration, the worker can guide the cart 600 into and approximate location beneath the vehicle 100 pending final positioning.

At 704, the cart 600 can begin final positioning under the vehicle 100. In some examples, this can include switching from forward-looking sensors 618 to upward- or downward-looking sensors 618. In other examples, the cart 600 can locate fiducials, holes, pins, or other locators on the vehicle 100 or on the ground beneath the vehicle 100 using the one or more of the sensors 618. Thus, the cart 600 can move to align the docking pins 608 with the appropriate pick-up points on the vehicle 100. The process of localizing the cart 600 is described in more detail below with reference to FIG. 8.

In other examples, the cart 600 can be manually maneuvered (i.e., by hand or with a remote control) into place by a worker. Thus, the cart 600 can include lights or a digital display, for example, to indicate which direction the cart 600 needs to be moved to be properly aligned with the vehicle 100 based on the sensor data. So, for example, the cart 600 can include four lights (right, left, forward, and backward) or arrows on an LCD screen, for example, to enable the worker to precisely located the cart 600 underneath the vehicle 100.

In some examples, in the operation 704, the cart 600 can also establish communications between the cart 600 and the vehicle 100. In some examples, the cart 600 can communicate with the vehicle 100 via a wireless connection (e.g., using Bluetooth® or Wi-Fi). In other examples, the cart 600 can communication with the vehicle 100 using a wired connection. Thus, as discussed above, a docking pin 608 on the cart 600, for example, can include a plug suitable to interface with a complementary plug on the vehicle 100.

In still other examples, the vehicle 100 and the cart 600 may be in communication with a central control (e.g., a central computer or cloud service) associated with the maintenance facility. Thus, each component 100, 600 can be in communication with the central control and providing status messages as the method 700 progresses. The central control can, in turn, provide commands to the components 100, 600 to perform various actions, as necessary.

Regardless of the method of communication, in some examples, the vehicle 100 can open hatches 752, covers, or other access panels as necessary to enable the cart 600 to access one or more pickup points or fasteners 206 on the vehicle 100 and/or drive unit 104, 106. Thus, as shown, the vehicle 100 may open a rear hatch 752, as shown by Arrow D, to enable the upper stanchions 612 to be positioned below pickup points on the top of the drive unit 104, 106.

At 706, for vehicles 100 with active suspensions, airbags, or otherwise moveable suspension components, the vehicle 100 can raise or lower the front suspension 754, as shown by Arrow E. In some examples, the vehicle 100 may perform this act in response to the cart 600 attaining a predetermined orientation, or pose, relative to the vehicle 100 (i.e., the vehicle 100 sensing the cart 600 is in the proper position). In other examples, the vehicle 100 may perform this act in response to a signal from the cart 600 or the central control. The vehicle 100 may first raise the suspension, for example, to provide additional clearance for the cart 600 and then lower the suspension to "squat" onto the cart 600.

As shown, raising the suspension on the vehicle 100 effectively lowers the vehicle 100 onto the cart 600. As mentioned above, in this configuration, the foot 614 can be substantially passive and can simply support the weight of the vehicle 100 when the drive unit 104, 106 is removed. In this configuration, therefore, as the body 102 lowers onto the foot 614, the foot 614 is trapped between the body 102 and the ground 756 and supports the vehicle 100. In some examples, the foot 614 can include a spring or shock, for example, that compresses as the body 102 is lowered to provide some cushion to the body 102.

In some examples, to provide additional clearance underneath the vehicle 100, the front suspension may initially lower (raise the vehicle 100) and then raise (lower the vehicle 100). So, when the vehicle 100 is placed into service mode, for example, the vehicle 100 may automatically raise slightly (e.g., 1-6") to increase clearance under the vehicle 100. In response to subsequently receiving a signal from the cart 600 or a central control, for example, the vehicle 100 can then lower onto the cart 600 raising the wheels off the ground.

For vehicles 100 with conventional, or passive, suspensions, the cart 600 and/or the foot 614 can include a jack to raise the first end 750 of the vehicle 100 slightly. This can enable the wheels 758 to be raised slightly off the ground 756 to enable the drive unit 104, 106 to be removed. In this configuration, the foot 614 can also support the body 102 as the drive unit 104, 106 is removed. As mentioned above, however, in this configuration, the foot 614 and/or the cart 600 can include a jack that uses hydraulic power, electric power, pneumatic power, or a combination thereof to lift the drive unit 104, 106 and/or body 102 to facilitate the removal of the drive unit 104, 106 from the body.

At 708, regardless of the lift mechanism, the torquing devices 610 on the cart 600 can engage with the drive interface(s) 310 on the fastening system 108. In some examples, the cart 600 the torquing device(s) 610 can already be properly located when the cart 600 located itself beneath the vehicle 100. In other words, the act of the cart 600 engaging with the vehicle 100 e.g., the vehicle 100 lowering on to the cart 600 or the cart 600 raising to meet the vehicle 100 engages the torquing devices 610 with the drive interface(s) 310 at the same time.

In other examples, the cart 600 can simply raise the torquing device(s) 610 (on the cart 600 and/or the upper stanchions 612) into place, as shown by Arrow F, with the torquing device(s) 610 having been previously located in the x- and y-axes by virtue of the cart 600 locating itself beneath the vehicle 100. In still other examples, the torquing device(s) 610 may include additional sensors to position and/or fine tune the location of the torquing device(s) 610 with respect to the drive interface(s) 310. Thus, the torquing device(s) 610 may move slightly fore and aft, left and right, and/or vertically to engage the drive interface(s) 310.

Once engaged, the torquing devices 610 can loosen the fasteners 206, which connect the drive unit 104, 106 to the body 102. To this end, the torquing device(s) 610 can rotate the driveshaft(s) 214, 302 (via the drive interface(s) 310) as necessary to remove the fasteners 206 (i.e., ultimately via the interface 316 or fastener inserts 502). Thus, the torquing device(s) 610 can rotate the fastener(s) 206 clockwise or counter-clockwise (for reverse thread) to remove the fastener(s) 206 from the body 102. As discussed above, in some examples, the fastener(s) 206 can be captured inside the fastening system 108 e.g., between the driven gear 308 and then housing 208 and can remain with the drive unit 104, 106 in mechanical engagement with the interface 316.

At 710, the cart 600 can lower the foot 614 (if applicable) and disengage from the vehicle stand 604. As discussed above, in some examples, the cart 600 can lower the foot 614, as shown by Arrow G, to support the body 102 when the drive unit 104 is removed. In addition, the cart 600 can include fasteners, latches 622, or other mechanisms to enable the cart 600 and the vehicle stand 604 to be detachable. This may be in response to a signal from the cart 600, vehicle 100, or central control to the vehicle stand 604. This can enable the vehicle stand 604 to separate from the main body 602 of the cart 600. At this point, the cart 600 can support the drive unit 104 while the foot 614 can support the body 102 of the vehicle 100.

At this stage, having separated from the vehicle stand 604, the cart 600 may slightly lower for clearance and can begin to move slowly backwards, as shown by Arrow H, to remove the drive unit 104, 106 from the body 102. In some examples, the cart 600 may continue to scan the body 102 with the sensors 618 to avoid collisions between the cart 600 and/or drive unit 104, 106 and the body 102. The cart 600 may also proceed at a first predetermined speed (e.g., less than 1 MPH) until the cart 600 and/or the drive unit 104, 106 has moved a first predetermined distance from the body 102.

At 712, once the cart 600 and/or the drive unit 104, 106 have reached the first predetermined distance from the body 102, the cart 600 may raise slightly and accelerate to a second predetermined speed (e.g., 1, 2, 3, 5, etc. MPH) to move the drive unit 104, 106 throughout the service facility. As discussed above, in some examples, the drive unit 104, 106 can be exchanged for a drive unit 104, 106 that had been, for example, repaired or recharged. In other examples, the drive unit 104, 106 can be removed to enable it to be repaired or to provide access to the body 102, or other components, for service and repair, as necessary.

FIGS. 7A and 7B are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects of interest, components, data structures, and the like that perform particular functions or implement particular abstract data types. The order in which the operations are described is not intended to be construed as a limitation, and any number of the described blocks can be combined in any order and/or in parallel to implement the processes.

For example, while shown removing the drive unit 104, 106 from the body 102, the cart 600 can also be used to reinstall the drive unit 104, 106 to the body 102 by essentially reversing the order of the steps. In addition, the cart 600 can also be used to install and remove different subassemblies and assemblies from different types of machines and mechanisms. Thus, the description of the method 700 above is intended to be illustrative, as opposed to limiting.

Figure 8:
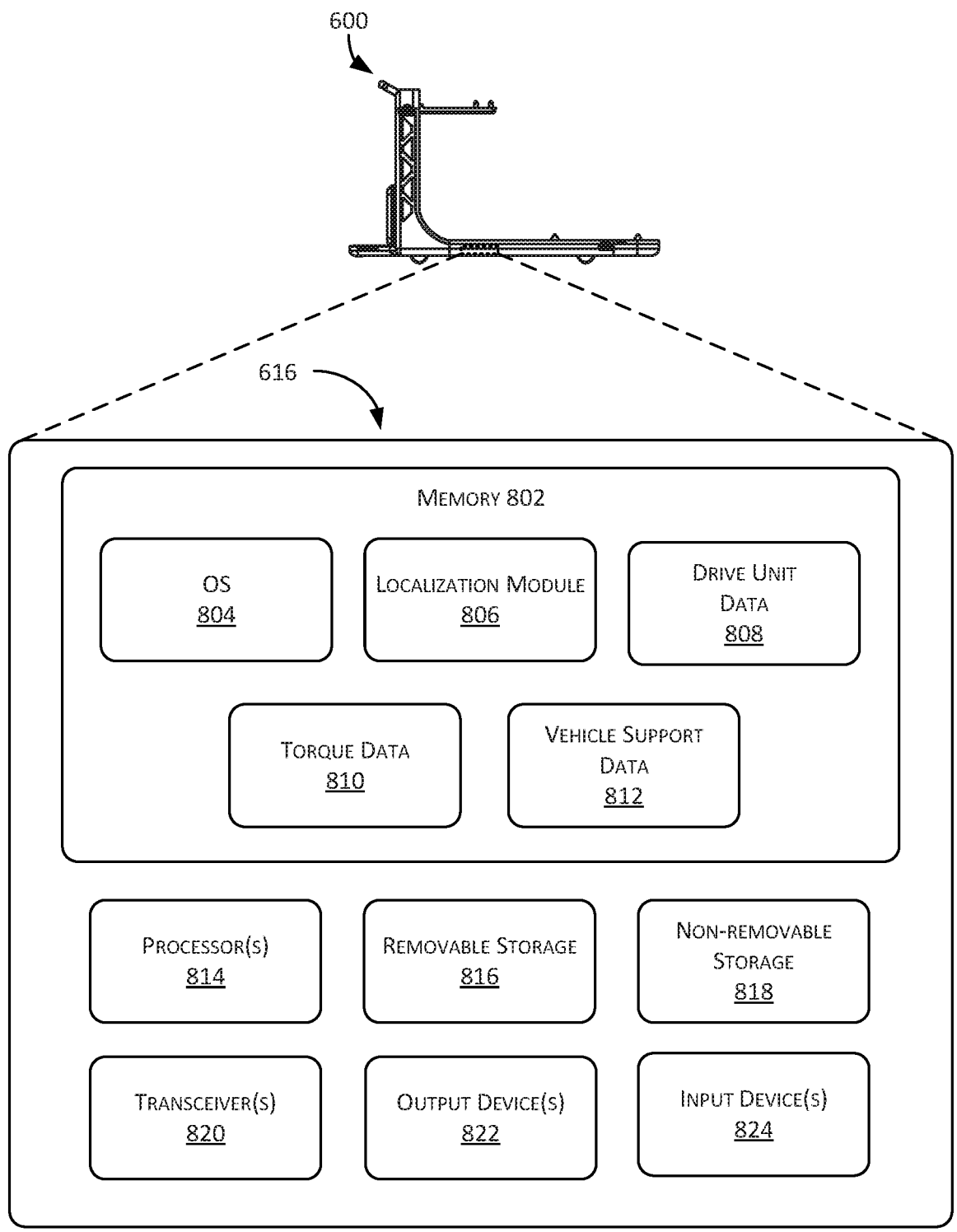
FIG. 8 is a component level view of an electronic device, such as a propulsion control system, in accordance with some examples of the present disclosure.

FIG. 8 is a component level schematic view an example of an electronic device. For ease of explanation, the electronic device is described in terms of the functions of the propulsion control system 616. One of skill in the art will recognize, however, that the electronic device can be used for many other functions in the vehicle 100 or cart 600, for example, with minor modification. Indeed, a similar electronic device can comprise a component of the torquing devices 610 or other electronic components for use with the systems 108, 600 and method 700 described herein. In some examples, the propulsion control system 616 can comprise a dedicated electronic device, such as a dedicated microcontroller. Other components of the cart 600, however, can comprise an electronic device with multiple functions such as, for example, a cell phone, smart phone, laptop, tablet, or another electronic device that comprise a number of components to gather data, communicate, and maneuver, among other things.

The propulsion control system 616 for the cart 600 can comprise memory 802 configured to include computer-executable instructions including at least an operating system (OS) 804 for receiving data and controlling the drive system(s) 606, sensors 618, and other components. The OS 804 can also make calculations (e.g., calculate the current distance between the vehicle 100 and the cart 600), communicate with other components in the vehicle 100 (e.g., to open the hatch 752), the torquing devices 610, and other components. The memory 802 can also include a localization module 806, a drive unit data 808, a torque data 810, and a vehicle support data 812.

The localization module 806 can receive sensor data from the sensors 618 on the cart 600 to calculate precise trajectories at a given frequency to maneuver the cart 600 safely through an environment (e.g., a maintenance facility or assembly plant), as described herein. Such a trajectory may correspond to a series of poses (i.e. position and orientation), linear and angular velocities, as well as linear and angular accelerations for the cart 600. In turn, such trajectories may be translated to control steering angles and torque and/or braking applied by the drive system(s) 606 on the cart 600.

The localization module 806 can receive current sensor data from the sensors 618. As mentioned above, this can include, for example, a variety of data from imagers (e.g. RGB cameras, RGB-D cameras, greyscale cameras, etc.), LIDAR, RADAR, GPS, and other sensors to localize the cart 600 (i.e. provide a position and/or orientation) relative to a map and relative to the vehicle 100. This can also include inputs from, for example, wheel encoders, gyroscopes, magnetometers, accelerometers and/or IMUs to provide linear acceleration and angular velocities. Deviations from an expected trajectory may then be measured from a measured position and/or orientation when localizing to position the cart 600 near to, and then under, the vehicle 100 being serviced.

In some examples, the cart 600 and/or the vehicle 100 can be positioned using one or more fiducials on the floor or walls of the service facility. In this configuration, the vehicle 100 can moved into the service facility and position itself relative to the fiducials (e.g., with a particular fiducial directly underneath a predetermined sensor on the vehicle 100). The cart 600 can then use the same fiducial(s) to precisely locate itself underneath the vehicle 100 in a similar manner. This positioning may also be supplemented with additional sensors (e.g., high-resolution video cameras) to confirm the positioning of the cart 600.

The memory 802 can also include the drive unit data 808. The drive unit data 808 can include location and tightening data for the various drive units 104, 106 being serviced. The drive unit data 808 can comprise, for example, the location of the drive interface(s) 310, including, for example, their location relative to the body 102 or drive units 104, 106, the height from ground, and other relevant information. The drive unit data 808 can also include the type of drives used on the drive interface(s) 310 such as, for example, internal or external drive interfaces, size, type (e.g., hex or Torx®), etc. In facilities that service multiple types of vehicles 100 or drive units 104, 106, the drive unit data 808 can also include this data about each type of drive unit 104, 106, vehicle 100, version, build number, and other variations.

The memory 802 can also include the torque data 810. The torque data 810 can include data about torque specifications and procedures to control the torquing devices 610. Thus, the torque data 810 can include torque values for each type or size of fastener 206, each drive unit 104, 106, each vehicle 100, etc. Thus, some drive units 104, 106 can include multiple fastener sizes, for example, each requiring a separate torque value. Other drive units 104, 106 may require a torquing sequence e.g., torque to 15 ft. lbs., then 45 ft. lbs., and then 75 ft. lbs. Similarly, some drive units 104, 106 may have torque-to-yield (TTY) fasteners 206 e.g., torque to 45 ft. lbs. and then turn an addition 90 degrees or other torquing procedures. In addition, many fasteners 206 can only be torqued once (e.g., TTY fasteners), while others can be only torqued a finite number of times, before they must be replaced. Thus, the torquing procedures, torque values, number of times the fastener has been torqued, and related data can be stored and updated in the torque data 810.

The memory 802 can also comprise a vehicle support data 812 to control the foot 614 and/or latches 622 on the vehicle stand 604. Depending on the type of latches 622 used, for example, the vehicle support data 812 can comprise a driver for a linear actuator, electromagnet, servo motor, or other suitable actuator. The vehicle support data 812 can also include data regarding the weight of the body 102, for example, and the location of various significant points on the body 102 for one or more vehicles 100. The vehicle support data 812 can include, for example, the location of various pickup points on the vehicle 100 to enable the cart 600 to align itself and the docking pins 608, among other things. The vehicle support data 812 can also include the location of jacking points on the body 102 to enable the vehicle stand 604 to be properly located under the body 102. This can reduce damage to the body 102 (e.g., the floor pans or pinch welds) caused by improper placement of the vehicle stand 604.

Of course, in some examples, rather than being stored in the propulsion control system 616, the localization module 806, drive unit data 808, torque data 810, vehicle support data 812, and other functions, or portions thereof, can be located on another component, such as the central control or another remote server, for example, and accessed by the propulsion control system 616 via a communication network.

The propulsion control system 616 can also include one or more processors 814, removable storage 816, non-removable storage 818, transceiver(s) 820, output device(s) 822, and input device(s) 824. In some implementations, the processor(s) 814 can comprise a central processing unit (CPU), a graphics processing unit (GPU), or both a CPU and a GPU, or any other sort of processing unit, including, but not limited to ASICs, FPGAs, microcontrollers and the like. The processor(s) 814 can be responsible for running software on the propulsion control system 616, including the OS 804 and other modules, and to interpret and send messages to the central control, if applicable. In some examples, the processor(s) 814 can also perform calculations and provide instructions based on the current localization data, torque data, etc.

The propulsion control system 616 can also include additional data storage devices (removable and/or non-removable) such as, for example, memory chips, magnetic disks, optical disks, or tape. Such additional storage is illustrated in FIG. 8 by removable storage 816 and non-removable storage 818. The removable storage 816 and non-removable storage 818 can store the various modules, programs, and algorithms for the OS 804 and other modules.

Non-transitory computer-readable media may include volatile and nonvolatile, removable and non-removable tangible, physical media implemented in technology for storage of information, such as computer readable instructions, data structures, program modules, or other data. The memory 802, removable storage 816, and non-removable storage 818 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information and which can be accessed by the propulsion control system 616. Any such non-transitory computer-readable media may be part of the propulsion control system 616 or may be a separate device (e.g., a jump drive) or a separate data or databank (e.g., at a central server).

In some implementations, the transceiver(s) 820 can include any sort of transceivers known in the art. The transceiver(s) 820 can include, for example, wireless modem(s) to facilitate wireless connectivity between the cart 600 and the torquing devices 610, vehicle 100, the Internet, and/or an intranet. Further, the transceiver(s) 820 may include a radio transceiver that performs the function of transmitting and receiving radio frequency communications via an antenna (e.g., cellular, Wi-Fi, or Bluetooth®). In some examples, the transceiver(s) 820 can also include wired transceivers to enable the cart 600 to establish communications between the cart 600 and the vehicle 100 via one or more docking pins 608, for example, as mentioned above.

In some implementations, the output device(s) 822 can include any sort of output devices known in the art, such as the displays (e.g., a liquid crystal display (LCD), light emitting diode (LED) display, or thin film transistor (TFT) screen), a touchscreen display, lights, speakers, a vibrating mechanism, or a tactile feedback mechanism to provide interactive feedback to an operator, a repair technician, etc. In some examples, the output device(s) 822 can play various sounds related to whether the cart 600 is "docked" with the vehicle 100, the distance between the cart 600 and the vehicle 100, during loosening or tightening sequences, etc. When removing a drive unit 104, 106 from a vehicle 100, for example, the cart 600 may "beep" when reversing, similar to commercial and construction vehicles. Output device(s) 822 can also include ports for one or more peripheral devices, such as headphones, peripheral speakers, or a peripheral display to provide feedback to operators, service technicians, or assembly line workers, for example.

In various implementations, input device(s) 824 can include any sort of input devices known in the art. For example, input device(s) 824 may include a microphone, a keyboard/keypad/touchpad, a touch-sensitive display, a proximity sensor, gyroscope, accelerometer, altimeter, and other sensors. A keyboard/keypad may be a standard push button alphanumeric, multi-key keyboard (such as a conventional QWERTY keyboard), a touchscreen keyboard, or one or more other types of keys or buttons, and may also include a joystick, wheel, and/or designated navigation buttons, or the like. In some examples, the input device(s) 824 can also include communication ports to receive data from service technicians (e.g., for updates), external sensors, or cameras, among other things.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

Example Clauses

A. A robotic cart comprising a drive system to move the robotic cart throughout an area, one or more transceivers to send and receive one or more wired and wireless transmissions, memory storing at least a localization module and torque data, one or more inputs to receive data from a user, and one or more processors in communication with at least the one or more transceivers, the memory, and the one or more inputs, the memory including computer executable instructions to cause the one or more processors to receive sensor data from one or more sensors disposed about a robotic cart, determine, using the sensor data, a pose of the robotic cart relative to a vehicle, plan a trajectory of the robotic cart based, at least in part, on the pose, the trajectory causing the robotic cart to align with one or more couplers of the vehicle, cause a drive unit of a robotic cart to move the robotic cart along the trajectory, send a first signal to torquing device on the robotic cart, the first signal causing a torquing device to rotate a drive interface in a first direction to remove a fastener from the vehicle, the fastener detachably coupling a subassembly to the vehicle, and move, using the drive unit, the robotic cart in a second direction away from the vehicle to remove the subassembly from the vehicle.

B. The robotic cart of paragraph A, wherein the sensor data comprises sensor data received from an environment proximate the vehicle and the robotic cart, the environment comprising one or more fiducials, and wherein the one or more fiducials comprise one or more artificial reality tags, bar codes, QR codes, or retroreflectors.

C. The robotic cart of paragraph A or B, further comprising a vehicle stand detachably coupled to the robotic cart, the computer executable instructions further causing the one or more processors to send a second signal to a latch detachably coupling the vehicle stand to the robotic cart, the second signal causing the latch to decouple the vehicle stand from the robotic cart, and send a third signal to cause a torquing device on the robotic cart to engage with a drive interface of a fastening system on a subassembly of the vehicle, wherein the vehicle stand of the robotic cart remains in place under a body of the vehicle to support the body with the subassembly removed.

D. The robotic cart of paragraph A, B, or C, the computer executable instructions further causing the one or more processors to send a fourth signal from the one or more processors to the vehicle stand to cause a portion of the vehicle stand to lower to a ground surface to support the body of the vehicle when the subassembly is removed.

E. The robotic cart of paragraph A, B, C, or D, the computer executable instructions further causing the one or more processors to send a second signal to the vehicle, the second signal causing the vehicle to alter a portion of a suspension of the vehicle to raise or lower the vehicle.

F. The robotic cart of paragraph A, B, C, D, or E, wherein rotating the drive interface with the torquing device comprises rotating a first driveshaft with a first torque device to remove a first fastener from a body of the vehicle, and rotating a second driveshaft a second torque device to remove a second fastener from the body of the vehicle.

G. A method comprising determining a first pose of a robotic cart based, at least in part, on sensor data received from one or more sensors disposed about the robotic cart, moving, using a drive unit, the robotic cart into a second pose relative to a vehicle, the second pose aligning a portion of a main body of the robotic cart with a vehicle stand disposed underneath a body of the vehicle, sending, using a transceiver of the robotic cart, a first signal to cause one or more latches to connect the vehicle stand to the robotic cart, sending, using the transceiver, a second signal to cause a torquing device on the robotic cart to rotate a drive interface of a fastening system of a subassembly of the vehicle in a first direction to tighten a fastener to detachably couple the subassembly to the vehicle, and moving, using the drive unit, the robotic cart in a second direction away from the vehicle.

H. The method of paragraph G, further comprising sending a third signal to cause a foot inside the vehicle stand to retract to lower the vehicle.

I. The method of paragraph G or H, wherein the sensor data comprises sensor data received from an environment proximate the vehicle and the robotic cart, the environment comprising one or more fiducials, and wherein the one or more fiducials comprise one or more artificial reality tags, bar codes, QR codes, or retroreflectors.

J. The method of paragraph G, H, or I, wherein rotating the drive interface with the torquing device comprises rotating an external driveshaft of the fastening system with a first torque device to tighten a first fastener to detachably couple the subassembly to the vehicle, and rotating an internal driveshaft of the fastening system with a second torque device to tighten a second fastener to detachably couple the subassembly to the vehicle.

K. The method of paragraph G, H, I, or J, wherein the first torque device tightens the first fastener, the second torque device tightens the second fastener, and the first torque is different than the second torque.

L. The method of paragraph G, H, I, J, or K, wherein the robotic cart moves at a first speed when the robotic cart is outside a first distance from the vehicle, and wherein the robotic cart moves at a second speed when the robotic cart is inside the first distance from the vehicle.

M. A robotic cart comprising an area for supporting a subassembly when the subassembly is removed from a vehicle, a drive system for moving the robotic cart throughout an environment, and a plurality of sensors to determine a pose of the robotic cart, and a torquing device, sized and shaped to engage with a fastening system of the subassembly of the vehicle, the torquing device rotating a driveshaft of the fastening system about a vertical axis, wherein rotating the driveshaft of the fastening system about the vertical axis causes a fastener of the subassembly to rotate about a horizontal axis, and wherein the fastener detachably couples the subassembly to the vehicle.

N. The robotic cart of paragraph M, wherein the torquing device includes a first torque device comprising a first drive interface configured to couple with a first driveshaft of the fastening system, and a second torque device, concentric to the first torque device, comprising a second drive interface configured to couple with a second driveshaft of the fastening system.

O. The robotic cart of paragraph M or N, wherein the first drive interface comprises a first external drive interface configured to interface with a first driveshaft of the fastening system, and wherein the second drive interface comprises a first internal drive interface or a second external drive interface to interface with a second driveshaft of the fastening system.

P. The robotic cart of paragraph M, N, or O, further comprising one or more couplers to couple with one or more pickup points of the subassembly.

Q. The robotic cart of paragraph M, N, O, or P, further comprising an upper stanchion comprising one or more couplers to couple with one or more additional pickup points of the subassembly.

R. The robotic cart of paragraph M, N, O, P, or Q, the upper stanchion comprising one or more actuators to move the upper stanchion between a lowered position and a raised position to support the subassembly.

S. The robotic cart of paragraph M, N, O, P, Q, or R, further comprising a vehicle stand, detachably coupled to the robotic cart, the vehicle stand including: one or more latches to releasable couple the vehicle stand to the robotic cart, one or more couplers to couple with one or more pickup points of the vehicle, and a foot to engage a body of the vehicle.

T. The robotic cart of paragraph M, N, O, P, Q, R, or S, the foot further comprising a jack to lift the body of the vehicle.

What is claimed is:

1. A robotic cart comprising:
a drive system to move the robotic cart throughout an area;
one or more transceivers to send and receive one or more wired and wireless transmissions;
memory storing at least a localization module and torque data;
one or more inputs to receive data from a user; and
one or more processors in communication with at least the one or more transceivers,
the memory, and
the one or more inputs,
the memory including
computer executable instructions to
cause the one or more processors to:
receive sensor data from
one or more sensors disposed about the robotic cart;
determine, using the sensor data, a pose of the robotic cart relative to a vehicle;
plan a trajectory of the robotic cart based, at least in part, on the pose,
the trajectory causing the robotic cart to align with one or more couplers of the vehicle;
cause a drive unit of a robotic cart to move the robotic cart along the trajectory;
send a first signal to torquing device on the robotic cart, the first signal causing a torquing device to rotate a drive interface in a first direction to remove a fastener from the vehicle, the fastener detachably coupling a subassembly to the vehicle, the subassembly comprising a portion of the vehicle; and
move, using the drive unit, the robotic cart in a second direction away from
the vehicle to remove the subassembly from the vehicle.

2. The robotic cart of claim 1, wherein the sensor data comprises sensor data received from an environment proximate the vehicle and the robotic cart, the environment comprising one or more fiducials; and
wherein the one or more fiducials comprise one or more artificial reality tags, bar codes, QR codes, or retroreflectors.

3. The robotic cart of claim 1, further comprising a vehicle stand detachably coupled to the robotic cart, the computer executable instructions further causing the one or more processors to:
send a second signal to a latch detachably coupling the vehicle stand to the robotic cart, the second signal causing the latch to decouple the vehicle stand from the robotic cart; and
send a third signal to cause a torquing device on the robotic cart to engage with a drive interface of a fastening system on a subassembly of the vehicle;
wherein the vehicle stand of the robotic cart remains in place under a body of the vehicle to support the body with the subassembly removed.

4. The robotic cart of claim 3, the computer executable instructions further causing the one or more processors to:
send a fourth signal from the one or more processors to the vehicle stand to cause a portion of the vehicle stand to lower to a ground surface to support the body of the vehicle when the subassembly is removed.

5. The robotic cart of claim 1, the computer executable instructions further causing the one or more processors to:
send a second signal to the vehicle, the second signal causing the vehicle to alter a portion of a suspension of the vehicle to raise or lower the vehicle.

6. The robotic cart of claim 1, wherein rotating the drive interface with the torquing device comprises:
rotating a first driveshaft with a first torque device to remove a first fastener from a body of the vehicle; and
rotating a second driveshaft a second torque device to remove a second fastener from the body of the vehicle.

7. A method comprising:
determining a first pose of a robotic cart based, at least in part, on sensor data received from one or more sensors disposed about the robotic cart;
moving, using a drive unit, the robotic cart into a second pose relative to a vehicle, the second pose aligning a portion of a main body of the robotic cart with a vehicle stand disposed underneath a body of the vehicle;
sending, using a transceiver of the robotic cart, a first signal to cause one or more latches to connect the vehicle stand to the robotic cart,
sending, using the transceiver, a second signal to cause a torquing device on the robotic cart to rotate a drive interface of a fastening system of a subassembly of the vehicle in a first direction to tighten a fastener to detachably couple the subassembly to the vehicle, the subassembly comprising a portion of the vehicle; and
moving, using the drive unit, the robotic cart in a second direction away from the vehicle.

8. The method of claim 7, further comprising:
sending a third signal to cause a foot inside the vehicle stand to retract to lower the vehicle.

9. The method of claim 7, wherein the sensor data comprises sensor data received from an environment proximate the vehicle and the robotic cart, the environment comprising one or more fiducials, and
wherein the one or more fiducials comprise one or more artificial reality tags, bar codes, QR codes, or retroreflectors.

10. The method of claim 7, wherein rotating the drive interface with the torquing device comprises:
rotating an external driveshaft of the fastening system with a first torque device to tighten a first fastener to detachably couple the subassembly to the vehicle; and
rotating an internal driveshaft of the fastening system with a second torque device to tighten a second fastener to detachably couple the subassembly to the vehicle.

11. The method of claim 10, wherein:
the first torque device tightens the first fastener;
the second torque device tightens the second fastener; and
the first torque is different than the second torque.

12. The method of claim 7, wherein the robotic cart moves at a first speed when the robotic cart is outside a first distance from the vehicle; and
wherein the robotic cart moves at a second speed when the robotic cart is inside the first distance from the vehicle.

13. A robotic cart comprising:
an area for supporting a subassembly when the subassembly is removed from a vehicle, the subassembly comprising a portion of the vehicle;
a drive system for moving the robotic cart throughout an environment; and
a plurality of sensors to determine a pose of the robotic cart; and
a torquing device, sized and shaped to engage with a fastening system of the subassembly of the vehicle, the torquing device rotating a driveshaft of the fastening system about a vertical axis,
wherein rotating the driveshaft of the fastening system about the vertical axis causes a fastener of the subassembly to rotate about a horizontal axis; and
wherein the fastener detachably couples the subassembly to the vehicle.

14. The robotic cart of claim 13, wherein the torquing device includes:
a first torque device comprising a first drive interface configured to couple with a first driveshaft of the fastening system; and
a second torque device, concentric to the first torque device, comprising a second drive interface configured to couple with a second driveshaft of the fastening system.

15. The robotic cart of claim 14,
wherein the first drive interface comprises a first external drive interface configured to interface with a first driveshaft of the fastening system; and
wherein the second drive interface comprises a first internal drive interface or a second external drive interface to interface with a second driveshaft of the fastening system.

16. The robotic cart of claim 13, further comprising:
one or more couplers to couple with one or more pickup points of the subassembly.

17. The robotic cart of claim 13, further comprising:
an upper stanchion comprising one or more couplers to couple with one or more additional pickup points of the subassembly.

18. The robotic cart of claim 17, the upper stanchion comprising one or more actuators to move the upper stanchion between a lowered position and a raised position to support the subassembly.

19. The robotic cart of claim 13, further comprising:
a vehicle stand, detachably coupled to the robotic cart, the vehicle stand including:
one or more latches to releasable couple the vehicle stand to the robotic cart;
one or more couplers to couple with one or more pickup points of the vehicle; and
a foot to engage a body of the vehicle.

20. The robotic cart of claim 19, the foot further comprising a jack to lift the body of the vehicle.

* * * * *